(12) United States Patent
Wu et al.

(10) Patent No.: US 12,040,731 B2
(45) Date of Patent: Jul. 16, 2024

(54) METHOD FOR CONTROLLING HEATING OF MOTOR AND CONTROL METHOD FOR MULTI-MOTOR DRIVE SYSTEM

(71) Applicant: Huawei Digital Power Technologies Co., Ltd., Shenzhen (CN)

(72) Inventors: Chaoqiang Wu, Shenzhen (CN); Mengxuan Lin, Dongguan (CN); Haojie Li, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 263 days.

(21) Appl. No.: 17/828,930

(22) Filed: May 31, 2022

(65) Prior Publication Data

US 2022/0294381 A1 Sep. 15, 2022

(30) Foreign Application Priority Data

Jun. 1, 2021 (CN) .......................... 202110610850.3

(51) Int. Cl.
*H02K 5/173* (2006.01)
*B60H 1/02* (2006.01)
*B60L 58/27* (2019.01)
*H02P 29/62* (2016.01)

(52) U.S. Cl.
CPC ............. *H02P 29/62* (2016.02); *B60H 1/02* (2013.01); *B60L 58/27* (2019.02)

(58) Field of Classification Search
CPC .................................. H02P 29/62; H02P 21/50
See application file for complete search history.

(56) References Cited

U.S. PATENT DOCUMENTS

| 2012/0200241 | A1 | 8/2012 | Kojima et al. |
| 2017/0294865 | A1 | 10/2017 | Inokuma et al. |
| 2018/0083509 | A1* | 3/2018 | Yang .................... H01M 10/625 |
| 2019/0249763 | A1* | 8/2019 | Yang .................... F16H 57/0436 |
| 2021/0039491 | A1* | 2/2021 | Merz ....................... F16H 57/04 |

FOREIGN PATENT DOCUMENTS

| CN | 103560304 A | 2/2014 |
| CN | 109314443 A | 2/2019 |
| CN | 208855418 U | 5/2019 |
| JP | 2001197607 A | 7/2001 |
| JP | 2010272395 A | 12/2010 |

\* cited by examiner

*Primary Examiner* — Muhammad S Islam
(74) *Attorney, Agent, or Firm* — Leydig, Voit & Mayer, Ltd.

(57) ABSTRACT

A method for controlling heating of a motor and a related controller are provided. The method includes: obtaining a heating target temperature value; determining, based on the heating target temperature value, a heating motor that needs to generate heat from a plurality of motors of a multi-motor drive system and heat generation power of the heating motor; and sending a first control instruction to the heating motor. The first control instruction is used to respectively input harmonic currents to three phases of windings of the motor, so that the heating motor generates heat based on the heat generation power. According to the application, the heating target temperature value is obtained, and the quantity of heating motors can be flexibly controlled to generate sufficient heat generation power.

16 Claims, 12 Drawing Sheets

METHOD FOR CONTROLLING HEATING OF MOTOR AND CONTROL METHOD FOR MULTI-MOTOR DRIVE SYSTEM

CROSS-REFERENCE TO RELATED APPLICATION

This application claims priority to Chinese Patent Application No. 202110610850.3, filed on Jun. 1, 2021, which is hereby incorporated by reference in its entirety.

TECHNICAL FIELD

Embodiments of this application relate to the field of electric vehicle technologies, and in particular, to a method for controlling heating of a motor and a control method for a multi-motor drive system.

BACKGROUND

In a low-temperature environment, an electric vehicle usually has two objects that need to be heated. One to-be-heated object is a battery, as a low temperature increases viscosity of an electrolyte in the battery, which reduces charging and discharging performance of the battery, and leads to a great decrease in endurance of the electric vehicle. The other to-be-heated object is a cabin, as a low temperature affects comfort for personnel in the cabin. Therefore, to ensure the charging and discharging performance of the battery and improve the comfort in the cabin, the battery and the cabin need to be heated in a low-temperature environment.

Existing electric vehicles are usually provided with a dedicated heating apparatus, such as a Positive Temperature Coefficient (PTC) component, to convert electric energy into thermal energy by using the PTC component, so that the battery and the cabin can be heated. The PTC component costs much (a single PTC component costs about 500 to 700 yuan), so that heating the battery and the cabin by using the PTC component increases system costs. Therefore, how to flexibly and effectively utilize heat generated by an existing component of the electric vehicle to heat the battery and the cabin so as to reduce or replace dedicated heating apparatuses becomes one of the important research directions.

SUMMARY

This application provides a method for controlling heating of a motor and a control method for a multi-motor drive system, so that a plurality of motors can be controlled to generate sufficient heat generation power.

To achieve the foregoing objective, a first aspect of this application provides a method for controlling heating of a motor, including: obtaining a heat generation instruction for the motor; and respectively inputting harmonic currents to three phases of windings of the motor according to the obtained instruction. The harmonic currents in the three phases of windings have a same time phase, and harmonic currents of two of the three phases of windings are equal. In this way, the harmonic currents are input to the three phases of windings of the motor, so that the three phases of windings can respectively generate pulsed magnetic fields, to generate a copper loss and a core loss, and cause both a stator and a rotor of the motor to generate heat, thereby increasing heat generation power of the motor and achieving more even heat generation of the motor. In addition, because the harmonic currents have the same time phase, a total magnetic field combined by the three pulsed magnetic fields can neither be a rotating magnetic field, nor drive the rotor of the motor to rotate. Because harmonic currents of two of the three phases of windings are equal, q-axis currents after the equal harmonic currents of the two phases of windings are projected onto dq-axis coordinates add up to zero, so that the rotor does not generate a torque. Therefore, the input harmonic currents cause the motor to generate heat, but do not affect a state of the rotor of the motor.

In a possible implementation of the first aspect, only a d-axis current is input to the three phases of windings of the motor. The d-axis current is input to the three phases of windings, so that the three phases of windings of the motor generate a rotating magnetic field, to generate a copper loss and a core loss, and cause both the stator and the rotor of the motor to generate heat, thereby increasing heat generation power of the motor and achieving more even heat generation of the motor. In addition, because no q-axis current is input, the rotor is idling without generating a torque.

In a possible implementation of the first aspect, the harmonic current is a d-axis harmonic current. This can avoid that, when the input harmonic current includes d-axis and q-axis components, due to a control precision problem, the q-axis component is not zero, thereby causing the rotor of the motor to generate a torque and affecting control over the motor; or when the current includes another harmonic, a component of the current on a q axis is not zero, thereby causing the rotor of the motor to generate a torque and affecting control over the motor.

In a possible implementation of the first aspect, a fundamental current is input to the three phases of windings of the motor at the same time, and the fundamental current causes the motor to output a torque. In this way, the fundamental current required by the motor to output a torque is input to the motor, so that the motor can rotate normally and output a torque. In addition, the harmonic currents can be further input, so that the motor can generate heat by using a copper loss and a core loss, and the motor can generate heat while outputting a torque, thereby improving flexibility of heat generation of the motor.

In a possible implementation of the first aspect, an amplitude of a current required to output a torque when the motor generates heat and outputs a torque is greater than an amplitude of a current required when the motor only outputs a torque. In this way, a current required by the motor to output a same torque can be increased, thereby reducing torque output efficiency of the motor, increasing power for generating waste heat, and improving heat generation efficiency of the motor.

In a possible implementation of the first aspect, the motor is an electrically excited motor, and an exciting current is input to the rotor of the motor. In this way, a copper loss can be generated in the rotor, so that the rotor generates heat, increasing heat generation power of the motor.

A second aspect of this application provides a control method for a multi-motor drive system. The multi-motor drive system is a drive system including two or more motors, and the method includes: obtaining a heating target temperature value: determining, based on the heating target temperature value, a heating motor that needs to generate heat from the plurality of motors of the multi-motor drive system, where there are one or more heating motors that need to generate heat: and sending a first control instruction to the heating motor, where the first control instruction is used to cause the heating motor to generate heat. In this way, after the heating target temperature value is obtained, a suitable quantity of heating motors can be selected in the plurality of motors to generate heat, so that the quantity of heating motors can be flexibly controlled to generate sufficient heat generation power.

In a possible implementation of the second aspect, the first control instruction is further used to cause the heating motor to operate in a first mode or a second mode. In the first mode, only harmonic currents are respectively input to three phases of windings of the heating motor, the harmonic currents in the three phases of windings have a same time phase, and the harmonic currents in the three phases of windings add up to zero. In the second mode, the harmonic currents are input while a fundamental current required by the heating motor to output a torque is input to the three phases of windings of the heating motor. This can control heat generation of the heating motor not to be affected regardless of whether the heating motor outputs a torque. Further, as for controlling a motor in a vehicle to generate heat, when the vehicle is in a running or stationary state, sufficient heat generation power can be obtained regardless of whether the heating motor outputs a torque, thereby further improving flexibility of motor control.

In a possible implementation of the second aspect, the method further includes: determining heat generation power of the heating motor based on the heating target temperature value. The first control instruction is further used to cause the heating motor to generate heat based on the heat generation power. In this way, the heat generation power can be distributed to the heating motor as required, so that the heating motor generates heat based on the determined heat generation power, thereby improving flexibility and redundancy of controlling the heating motor to generate heat.

In a possible implementation of the second aspect, the method further includes: sending a second control instruction to a non-heating motor in the plurality of motors other than the heating motor. The second control instruction is used to control the non-heating motor to operate in a third mode or to be powered off. In the third mode, only a fundamental current required by the non-heating motor to output a torque is input to the non-heating motor. In this way, the non-heating motor can be controlled to output a torque or to be powered off, thereby improving flexibility of motor control.

In a possible implementation of the second aspect, the first control instruction is further used to control efficiency of outputting a torque when the heating motor operates in the second mode to be lower than efficiency of outputting a torque of the non-heating motor in the third mode. The efficiency of outputting a torque may be controlled by controlling a current input to the three phases of windings of the motor. Lower efficiency of outputting a torque by the motor indicates greater heat generated when the torque is output. When the heating motor operates in the second mode and needs to output a torque and generate heat, the heating motor is controlled to output a torque at low efficiency, so that heat generation power of the heating motor operating in the second mode can be increased.

In a possible implementation of the second aspect, the method further includes: when a temperature of the heating motor is higher than a first temperature threshold, sending a third control instruction to the heating motor. The third control instruction is used to reduce the heat generation power of the heating motor, or control the heating motor to switch from the first mode or the second mode to the third mode or to be powered off. In this way, when the temperature of the heating motor is higher than the first temperature threshold, the temperature of the motor can be reduced by reducing the heat generation power of the heating motor or controlling the heating motor to switch to a non-heating motor, to prevent an insulation material on the surface of the three phases of windings from being damaged by an excessively high temperature of the motor, or prevent magnetic steel in the motor from being demagnetized due to an excessively high temperature when the motor is a permanent magnet motor.

In a possible implementation of the second aspect, when a temperature of a to-be-heated object is lower than a second temperature threshold, a prestored heating target temperature value is obtained. In this way, when the temperature of the to-be-heated object is lower than the second temperature threshold, the heating target temperature value can be automatically obtained, to control the motor to generate heat, so as to heat the to-be-heated object.

A third aspect of this application provides a motor controller. The motor controller obtains a heat generation instruction for a motor. The motor controller respectively inputs harmonic currents to three phases of windings of the motor according to the obtained instruction. The harmonic currents in the three phases of windings have a same time phase, and harmonic currents of two of the three phases of windings are equal. In this way, the harmonic currents are input to the three phases of windings of the motor, so that the three phases of windings can respectively generate pulsed magnetic fields, to generate a copper loss and a core loss, and cause both a stator and a rotor of the motor to generate heat, thereby increasing heat generation power of the motor and achieving more even heat generation of the motor. In addition, because the harmonic currents have the same time phase, a total magnetic field combined by the three pulsed magnetic fields can neither be a rotating magnetic field, nor drive the rotor of the motor to rotate. Because harmonic currents of two of the three phases of windings are equal, q-axis currents after the equal harmonic currents of the two phases of windings are projected onto dq-axis coordinates add up to zero, so that the rotor does not generate a torque. Therefore, the input harmonic currents cause the motor to generate heat, but do not affect a state of the rotor of the motor.

In a possible implementation of the third aspect, the motor controller inputs only a d-axis current to the three phases of windings of the motor. The d-axis current is input to the three phases of windings, so that the three phases of windings of the motor generate a rotating magnetic field, to generate a copper loss and a core loss for heat generation, and cause both the stator and the rotor of the motor to generate heat, thereby increasing heat generation power of the motor and achieving more even heat generation of the motor. In addition, because no q-axis current is input, the rotor is idling without generating a torque.

In a possible implementation of the third aspect, the harmonic current is a d-axis harmonic current. This can avoid that, when the input harmonic current includes d-axis and q-axis components, due to control precision, another harmonic included in the current, or the like, the q-axis component is not zero, thereby causing the rotor of the motor to generate a torque and affecting control over the motor.

In a possible implementation of the third aspect, the motor controller inputs a fundamental current to the three phases of windings of the motor at the same time, and the fundamental current causes the motor to output a torque. In this way, the fundamental current required by the motor to output a torque is input to the motor, so that the motor can rotate normally and output a torque. In addition, the harmonic currents can be further input, so that the motor can generate heat by using a copper loss and a core loss, and the motor can generate heat while outputting a torque, thereby improving flexibility of heat generation of the motor.

In a possible implementation of the third aspect, an amplitude of a current required to output a torque when the motor generates heat and outputs a torque is greater than an amplitude of a current required when the motor only outputs a torque. In this way, a current required by the motor to output a same torque can be increased, thereby reducing torque output efficiency of the motor, increasing power for generating waste heat, and improving heat generation efficiency of the motor.

In a possible implementation of the third aspect, the motor is an electrically excited motor, and the motor controller inputs an exciting current to the rotor of the motor. In this way, a copper loss can be generated in the rotor, so that the rotor generates heat, increasing heat generation power of the motor.

A fourth aspect of this application provides a controller, configured to control a multi-motor drive system. The multi-motor drive system includes two or more motors. The controller obtains a heating target temperature value. The controller determines, based on the heating target temperature value, a heating motor that needs to generate heat from the plurality of motors of the multi-motor drive system. The controller sends a first control instruction to the heating motor. The first control instruction is used to cause the heating motor to generate heat. In this way, after the heating target temperature value is obtained, a suitable quantity of heating motors can be selected in the plurality of motors to generate heat, so that the quantity of heating motors can be flexibly controlled to generate sufficient heat generation power.

In a possible implementation of the fourth aspect, the first control instruction is further used to cause the heating motor to operate in a first mode or a second mode. In the first mode, harmonic currents are respectively input to three phases of windings of the heating motor, the harmonic currents in the three phases of windings have a same time phase, and the harmonic currents in the three phases of windings add up to zero. In the second mode, the harmonic currents are input while a fundamental current required by the heating motor to output a torque is input to the three phases of windings of the heating motor. In this way, whether the heating motor operates in the first mode or the second mode can be determined as required, and the heating motor can generate heat regardless of whether the heating motor is in a state of outputting a torque. Therefore, when a vehicle is running or stationary, regardless of whether the heating motor needs to output a torque, heat can be generated to heat a to-be-heated object such as a battery or a cabin, thereby further improving flexibility of motor control.

In a possible implementation of the fourth aspect, the controller is further configured to determine heat generation power of the heating motor based on the heating target temperature value. The first control instruction is further used to cause the heating motor to generate heat based on the heat generation power. In this way, the heating motor can be controlled to generate heat based on the determined heat generation power, thereby improving flexibility and redundancy of controlling the heating motor to generate heat.

In a possible implementation of the fourth aspect, the controller sends a second control instruction to a non-heating motor in the plurality of motors other than the heating motor. The second control instruction is used to control the non-heating motor to operate in a third mode or to be powered off. In the third mode, only a fundamental current required by the non-heating motor to output a torque is input to the non-heating motor. In this way, the non-heating motor can be controlled to output a torque or to be powered off, thereby improving flexibility of motor control.

In a possible implementation of the fourth aspect, the first control instruction is further used to control efficiency of outputting a torque when the heating motor operates in the second mode to be lower than efficiency of outputting a torque of the non-heating motor in the third mode. The efficiency of outputting a torque may be controlled by controlling a current input to the three phases of windings of the motor. Lower efficiency of outputting a torque by the motor indicates greater heat generated when the torque is output. When the heating motor operates in the second mode and needs to output a torque and generate heat, the heating motor is controlled to output a torque at low efficiency, so that heat generation power of the heating motor operating in the second mode can be increased.

In a possible implementation of the fourth aspect, when a temperature of the heating motor is higher than a first temperature threshold, the controller sends a third control instruction to the heating motor. The third control instruction is used to reduce the heat generation power of the heating motor, or control the heating motor to switch from the first mode or the second mode to the third mode or to be powered off. In this way, when the temperature of the heating motor is higher than the first temperature threshold, the temperature of the motor can be reduced by reducing the heat generation power of the heating motor or controlling the heating motor to switch to a non-heating motor, to prevent an insulation material on the surface of the three phases of windings from being damaged by an excessively high temperature of the motor, or prevent magnetic steel in the motor from being demagnetized due to an excessively high temperature when the motor is a permanent magnet motor.

In a possible implementation of the fourth aspect, when a temperature of a to-be-heated object is lower than a second temperature threshold, the controller obtains a prestored heating target temperature value. In this way, when the temperature of the to-be-heated object is lower than the second temperature threshold, the controller can automatically obtain the heating target temperature value, to control the motor to generate heat, so as to heat the to-be-heated object.

A fifth aspect of this application provides a multi-motor drive system, including a plurality of motors, and any possible implementation form of the controller in the fourth aspect of this application, configured to control the plurality of motors. In this way, after a heating target temperature value is obtained, a suitable quantity of heating motors can be selected in the plurality of motors to generate heat, and heat generation power of the heating motor can be determined based on heating power required by a to-be-heated object. Therefore, the quantity of heating motors can be flexibly controlled to generate sufficient heat generation power.

A sixth aspect of this application provides a vehicle, including the multi-motor drive system in the third aspect of this application. In this way, after a heating target temperature value is obtained, a suitable quantity of heating motors can be selected in a plurality of motors to generate heat, and heat generation power of the heating motor can be determined based on heating power required by a to-be-heated object. Therefore, the quantity of heating motors can be flexibly controlled to generate sufficient heat generation power.

A seventh aspect of this application provides a computing device, including at least one processor and at least one memory. The memory stores program instructions, and when the program instructions are executed by the at least one processor, the at least one processor is enabled to perform any method in the first aspect or the second aspect of this application.

An eighth aspect of this application provides a computer-readable storage medium, storing program instructions. When the program instructions are executed by a computer, the computer is enabled to perform any method in the first aspect or the second aspect of this application.

A ninth aspect of this application provides a computer program. When the computer program is executed by a controller, the controller is enabled to perform any method in the first aspect or the second aspect of this application.

DESCRIPTION OF DRAWING MARKS

Figure 1:
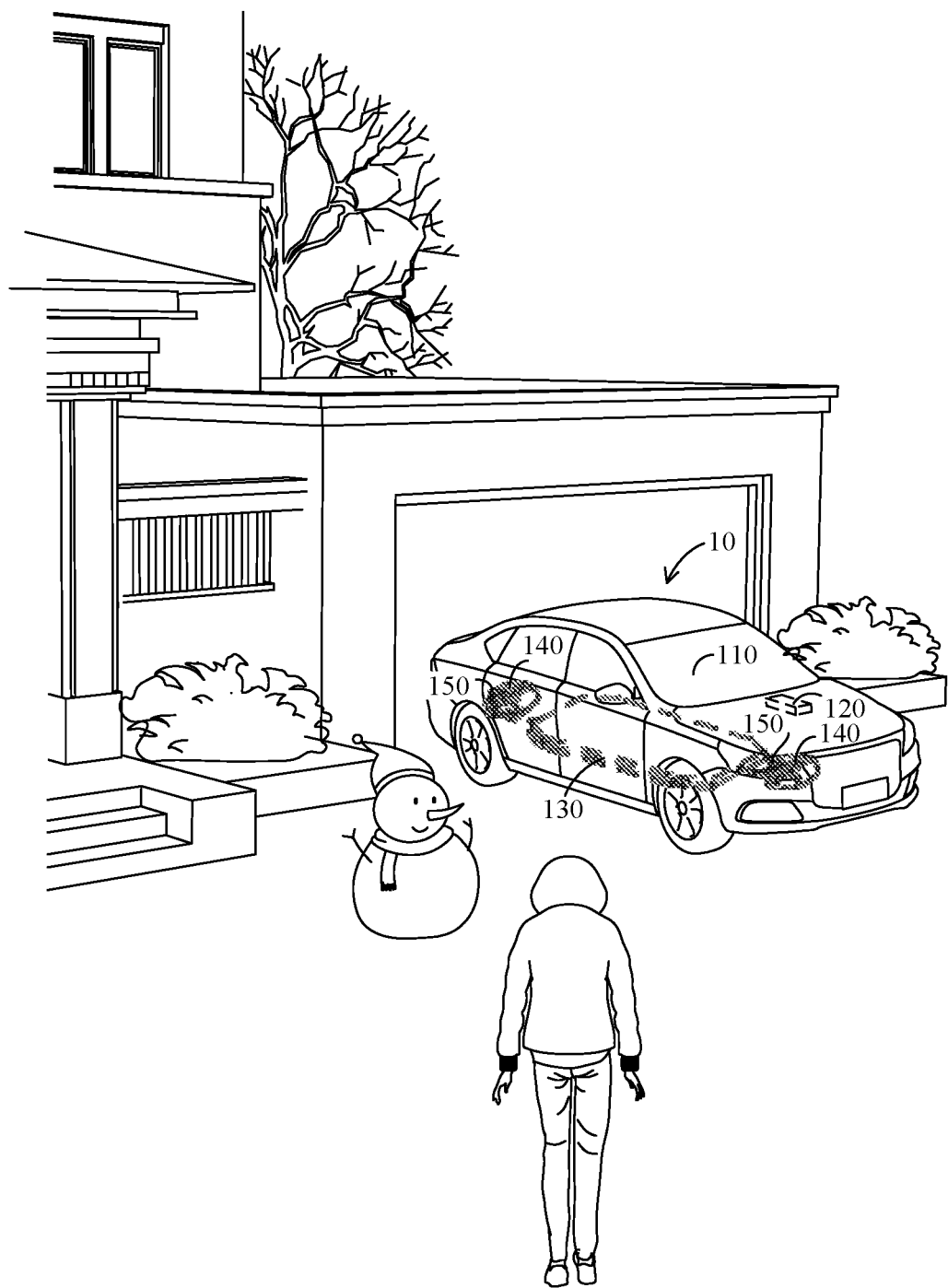
FIG. 1 is a schematic diagram of an application scenario of a method, a controller, and the like according to an embodiment of this application.

10: vehicle; 110: cabin; 120: controller: 130: battery: 140: motor; 141: permanent magnet motor; 142: electrically excited motor; 143: asynchronous motor; 150: MCU; 160: temperature sensor; 170: heat exchanger; 181: first circulation pipe; 182: second circulation pipe; 183: third circulation pipe; 1500: computing device; 1510: processor; 1520: memory; 1530: communications interface; and 1540: bus.

DESCRIPTION OF EMBODIMENTS

The words such as "first", "second", and "third" or similar terms such as a module A, a module B, and a module C in the specification and claims are only used to distinguish similar objects, and do not represent particular sorting of the objects. It may be understood that, where permitted, particular orders or sequences may be interchanged so that the embodiments of this application described herein can be implemented in orders other than those illustrated or described herein.

In the following description, reference numerals, such as S110 and S120 . . . , of related steps do not indicate that the steps are necessarily performed in such an order. Where permitted, steps may be performed in a reversed order or at the same time.

The term "including", "comprising", or any other variant thereof as used in the specification and claims shall not be construed as being limited to content set forth thereafter, and other elements or steps are not excluded. Therefore, it should be interpreted as specifying existence of a mentioned feature, whole, step, or component, but not excluding existence or addition of one or more other features, wholes, steps, or components and a group thereof. Therefore, an expression "device including apparatuses A and B" should not be limited to a device including only the components A and B.

References to "one embodiment" or "an embodiment" in this specification mean that particular features, structures, or characteristics described in conjunction with the embodiment are included in at least one embodiment of the present invention. Therefore, the terms "in one embodiment" or "in an embodiment" as used throughout this specification do not necessarily refer to the same embodiment, but may refer to the same embodiment. In addition, in one or more embodiments, the particular features, structures, or characteristics can be combined in any suitable manner, as will be apparent to persons of ordinary skill in the art from this disclosure.

First, to better understand the technical solutions in the embodiments of this application, definitions of terms in this application are described.

Permanent magnet motor: A permanent magnet is embedded in a rotor of the permanent magnet motor to provide the rotor with an excitation magnetic field.

Electrically excited motor: A rotor winding is disposed in a rotor of the electrically excited motor, and a direct current is input to the rotor winding to provide the rotor with an excitation magnetic field.

Asynchronous motor: It is also referred to as an induction motor. A squirrel cage is embedded in a rotor, and a current is induced in the squirrel cage through motion of the rotor relative to a magnetic field of a stator.

Direct axis: It is also referred to as a d axis, and comes from a simplified translation of direct axis or d-axis.

Quadrature axis: It is also referred to as a q axis, and comes from a simplified translation of quadrature axis or q-axis.

Zero axis: It is a common-mode component loop of a three-phase system.

Components of the d, q, and zero axes may be obtained through Park transformation by using currents $I_A$, $I_B$, and $I_C$ in three phases of windings, and are specifically expressed as follows:

$$\begin{bmatrix} I_d \\ I_q \\ I_0 \end{bmatrix} = \frac{2}{3} \begin{bmatrix} \cos(\theta) & \cos(\theta - 2\pi/3) & \cos(\theta + 2\pi/3) \\ -\sin(\theta) & -\sin(\theta - 2\pi/3) & -\sin(\theta + 2\pi/3) \\ 1/2 & 1/2 & 1/2 \end{bmatrix} \begin{bmatrix} I_A \\ I_B \\ I_C \end{bmatrix}$$

Park transformation: It is a motor analysis method of projecting stationary three-phase coordinates onto a direct axis (d axis) and a quadrature axis (q axis) in dq-axis coordinates rotating along with a rotor and a zero axis (0 axis) perpendicular to a dq plane, which implements diagonalization of a stator inductance matrix, and simplifies operation analysis of a synchronous motor.

Copper loss: It is heat generated by an alternating current/a direct current passing through a copper conductor in a winding. Heat generation power is calculated by $I^2R$, I is the current (an effective value of the direct current or the alternating current) that passes, and R is resistance of the conductor.

Core loss: It is a loss caused by a magnetic flux of an alternating magnetic field in an iron core of a ferromagnetic material (such as steel or a silicon steel sheet), including a magnetic hysteresis loss, an eddy current loss, an additional loss, and the like.

Pulsed magnetic field: It is a magnetic field with a magnetic field strength changing with a periodic change of an alternating current. Unless otherwise defined, all technical and scientific terms used in this specification have a same meaning as that usually understood by a person skilled in the art of this application. In case of any inconsistency, the meanings stated in this specification or derived from content recorded in this specification shall be used. In addition, the terms used in this specification are merely for the purpose of describing the embodiments of this application, but are not intended to limit this application.

In a low-temperature environment, to meet a heating requirement of a battery or a cabin, one solution is to energize a stator of a motor without causing a rotor to rotate. In this way, the battery and the cabin may be heated by using heat generated by a copper loss in a stator winding. However, this solution can heat the battery and the cabin only when the rotor is stationary. In addition, because only the heat generated by the copper loss of the motor is used, heat generation power is low; and sometimes it is difficult to meet heating requirements of the battery and the cabin. Another solution is to use a motor as a buffer to limit a current rise rate. A discharge current of a power battery is controlled by using a motor control system, so that the power battery can generate heat by using internal resistance. In this way, the battery is heated. However, because the internal resistance of the battery is generally small and heat generation power is low; it is difficult to meet the heating requirement of the battery.

In view of the foregoing problems of the conventional technologies, this application proposes embodiments of a control method for a multi-motor drive system, a controller, and a vehicle that are described in detail below:

FIG. 1 is a schematic diagram of an application scenario of a method, a controller, and the like according to an embodiment of this application. As shown in FIG. 1, the vehicle 10 includes a cabin 110, a controller 120, a battery 130, a plurality of motors 140, and MCUs (Motor Control Unit) disposed corresponding to the motors 140. The plurality of motors 140 form a multi-motor drive system, configured to drive the vehicle 10 to run. The battery 130 is configured to supply electric energy to the motor 140. The MCU may control currents in three phases of windings of the motor 140. The controller 120 may control the MCU to control the motor 140 to output a torque or generate heat.

When the vehicle 10 is in an environment with a relatively low outdoor temperature, such as winter, charging and discharging performance of the battery 130 and comfort in the cabin 110 are greatly reduced due to impact of the low temperature. Therefore, in a low-temperature environment, to improve the charging and discharging performance of the battery 130 and improve the comfort in the cabin 110, after the vehicle 10 in this embodiment of this application is started, the controller 120 may control the plurality of motors 140 by using the MCUs 150, so that the motors 140 can generate heat. Finally, the battery 130 or the cabin 110 is heated by using the heat generated by the motors 140, to increase temperatures of the battery 130 and the cabin 110, improve the charging and discharging performance of the battery 130, and improve the comfort in the cabin 110 of the vehicle 10.

The vehicles 10 in FIG. 1 and this specification are all described by using an electric vehicle as an example, which should not be considered as a limitation on the embodiments of this application. The vehicle 10 may be a battery electric vehicle or a hybrid electric vehicle. The vehicle 10 may be any one of different types of vehicles such as a car, a truck, a passenger bus, and an SUV (sport utility vehicle), or may be a land transportation apparatus for carrying people or goods, such as a tricycle, a motorcycle, or a train. Alternatively, the multi-motor drive system in this application is not limited to being disposed inside the vehicle 10, and may be further applied to other types of vehicles such as an aircraft or a ship. Even, the multi-motor drive system in this embodiment of this application is not limited to being disposed in a vehicle, and may be further disposed in any other device having a heating requirement.

The motors 140 in the multi-motor drive system may be, for example but not limited to, motors 140 of types such as a permanent magnet motor 141, an electrically excited motor 142, and an asynchronous motor 143. The multi-motor drive system may be a two-motor system, a three-motor system, or a four-motor system, or may be a system with more motors 140. The two motors 140 may be two front motors 140 or two rear motors 140, or may be one front motor 140) and one rear motor 140. The three motors 140 may be two front motors 140 and a single rear motor 140, or may be a single front motor 140 and two rear motors 140. The motors 140 in the multi-motor drive system may be motors 140 of a same type, or may be motors 140 of different types. Quantities of motors 140 of different types in the multi-motor drive system may be the same or different. An arrangement form of the motors 140 in the multi-motor drive system in this embodiment of this application is merely used as an example, and should not be considered as a limitation on this application.

An embodiment of this application provides a method for controlling heating of the motor 140, so that the motor 140 can be controlled to generate heat. The method includes: obtaining a heat generation instruction for the motor 140; and respectively inputting harmonic currents to the three phases of windings of the motor 140 according to the obtained instruction. The harmonic currents in the three phases of windings have a same time phase, and harmonic currents of two of the three phases of windings are equal. In this way, the harmonic currents are input to the three phases of windings of the motor 140, so that the three phases of windings can respectively generate pulsed magnetic fields, to generate a copper loss and a core loss, and cause both a stator and a rotor of the motor 140 to generate heat, thereby increasing heat generation power of the motor 140 and achieving more even heat generation of the motor 140. In addition, because the harmonic currents have the same time phase, a total magnetic field combined by the three pulsed magnetic fields can neither be a rotating magnetic field, nor drive the rotor of the motor 140 to rotate. Because harmonic currents of two of the three phases of windings are equal, q-axis currents after the equal harmonic currents of the two phases of windings are projected onto dq-axis coordinates add up to zero, so that the rotor does not generate a torque.

Therefore, the input harmonic currents cause the motor 140 to generate heat, but do not affect a state of the rotor of the motor 140.

Alternatively, only a d-axis current is input to the three phases of windings of the motor 140. The d-axis current is input to the three phases of windings, so that the three phases of windings of the motor 140 generate a rotating magnetic field, to generate a copper loss and a core loss for heat generation, and cause both the stator and the rotor of the motor 140 to generate heat, thereby increasing heat generation power of the motor 140 and achieving more even heat generation of the motor 140. In addition, because no q-axis current is input, the rotor is idling without generating a torque.

In some embodiments, the harmonic current is a d-axis harmonic current. This can avoid that, when the input harmonic current includes d-axis and q-axis components, due to control precision, another harmonic included in the current, or the like, the q-axis component is not zero, thereby causing the rotor of the motor 140 to generate a torque and affecting control over the motor 140).

In some embodiments, a fundamental current is input to the three phases of windings of the motor 140 at the same time, and the fundamental current causes the motor 140 to output a torque. In this way, the fundamental current required by the motor 140 to output a torque is input to the motor, so that the motor 140 can rotate normally and output a torque. In addition, the harmonic currents can be further input, so that the motor 140 can generate heat by using a copper loss and a core loss, and the motor 140 can generate heat while outputting a torque, thereby improving flexibility of heat generation of the motor 140.

In some embodiments, an amplitude of a current required to output a torque when the motor 140 generates heat and outputs a torque is greater than an amplitude of a current required when the motor 140 only outputs a torque. In this way, a current required by the motor 140 to output a same torque can be increased, thereby reducing torque output efficiency of the motor 140, increasing power for generating waste heat, and improving heat generation efficiency of the motor 140).

An embodiment of this application further provides a motor controller, configured to implement the method for controlling heating of the motor 140. The motor controller may be a dedicated MCU 150 configured to control a single motor or the controller 120 controlling the plurality of motors 140, or may be another control apparatus.

An embodiment of this application further provides a control method for the multi-motor drive system, so that the plurality of motors 140 in the multi-motor drive system can be controlled to generate heat, to increase heat generation power and heat a to-be-heated object such as the cabin 110 and the battery 130.

Figure 2A:
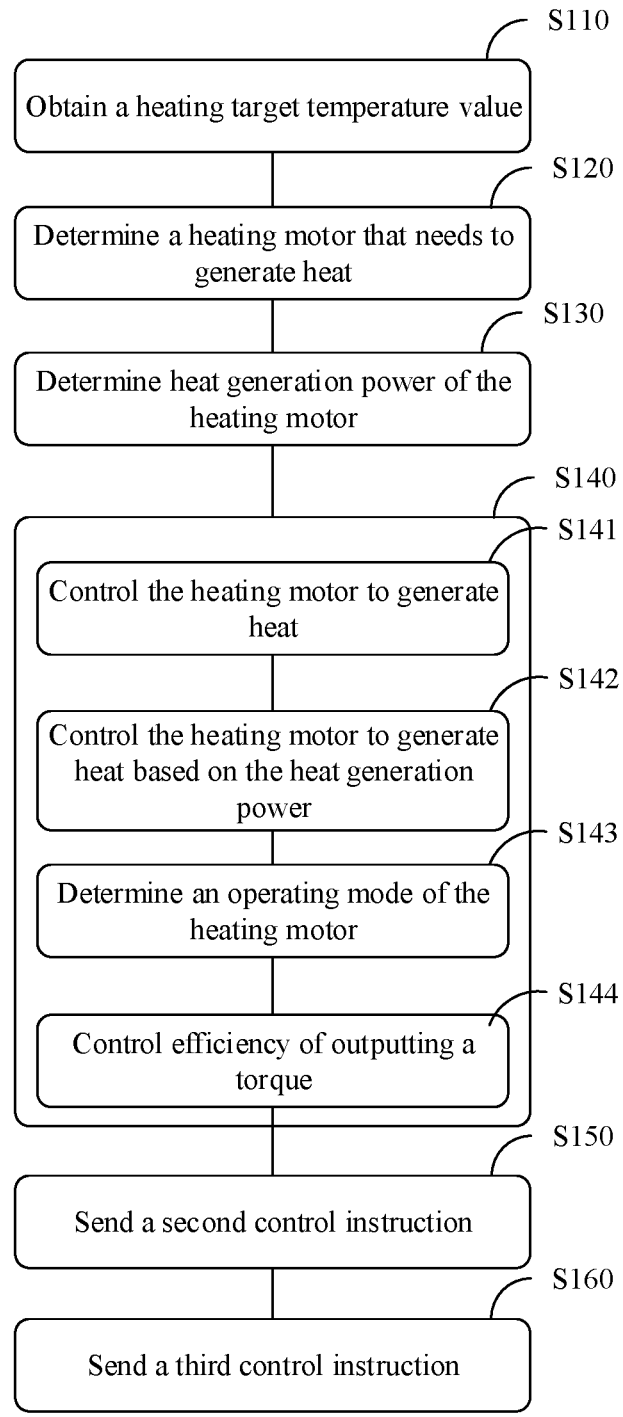
FIG. 2A is a schematic flowchart of a control method for a multi-motor drive system according to an embodiment of this application.

FIG. 2A is a schematic flowchart of a control method for a multi-motor drive system according to an embodiment of this application. The control method for a multi-motor drive system shown in FIG. 2A may be performed by the controller 120 in FIG. 1 or any other suitable device. The multi-motor drive system is a drive system including two or more motors 140. As shown in FIG. 2A, the control method for a multi-motor drive system may include step S110 to step S140.

Step S110: Obtain a heating target temperature value. A manner of obtaining the heating target temperature value is not limited. For example, when a temperature of a to-be-heated object is lower than a temperature threshold, a prestored heating target temperature value is obtained. Alternatively, a request signal for heating a to-be-heated object is received, and the request signal includes a heating target temperature value. The to-be-heated object includes, but is not limited to, the battery 130 and the cabin 110.

Step S120: Determine, based on the heating target temperature value, a heating motor 140 that needs to generate heat from the plurality of motors 140 of the multi-motor drive system. There are one or more heating motors 140 that need to generate heat. A quantity of heating motors 140 that need to generate heat may be determined based on the heating target temperature value, so that sufficient heat generation power can be generated to heat the to-be-heated object such as the battery 130 and the cabin 110.

Step S140: Send a first control instruction to the heating motor. Step S140 includes step S141. Step S141: Control the heating motor 140 to generate heat.

It can be seen from the foregoing description that, in the solution of this embodiment, after the heating target temperature value is obtained, the heating motor 140 that needs to generate heat can be determined from the plurality of motors 140, so that heat of sufficient power can be generated by a proper quantity of heating motors 140 at proper positions, which increases redundancy of the system, and can heat the to-be-heated object such as the battery 130 and the cabin 110 in a low-temperature environment, thereby replacing a conventional PTC component and reducing system costs. In this way, charging and discharging performance of the battery 130 can be improved, to avoid a great decrease in endurance of the electric vehicle 10, and a temperature in the cabin 110 can be increased, to improve comfort.

In some embodiments, step S140 may further include step S143. Step S143: Cause the heating motor 140 to operate in a first mode or a second mode. In the first mode, only harmonic currents are respectively input to three phases of windings of the heating motor 140, the harmonic currents in the three phases of windings have a same time phase, and the harmonic currents in the three phases of windings add up to zero. In the second mode, the harmonic currents are input while a fundamental current required by the heating motor 140 to output a torque is input to the three phases of windings of the heating motor 140. Whether the heating motor 140 operates in the first mode or the second mode can be determined as required, and the heating motor 140 can generate heat regardless of whether the heating motor is in a state of outputting a torque. Therefore, when the vehicle 10 is running or stationary, regardless of whether the heating motor 140 needs to output a torque, heat can be generated to heat the to-be-heated object such as the battery 130 or the cabin 110, thereby further improving flexibility of motor control.

In some embodiments, the method further includes step S130. Step S130: Determine heat generation power of the heating motor 140 based on the heating target temperature value.

Step S140 may further include step S142. Step S142: Cause the heating motor 140 to generate heat based on the heat generation power.

In this way, the heat generation power of the heating motor 140 can be determined based on the heating target temperature value, to control the heating motor 140 to generate heat based on the determined heat generation power. Therefore, heat generation power of each heating motor 140 can be distributed as required, thereby improving flexibility and redundancy of controlling the heating motor 140 to generate heat.

In some embodiments, the control method may further include step S150. Step S150: Send a second control instruction to a non-heating motor 140 in the plurality of motors 140 other than the heating motor 140. The second control instruction is used to control the non-heating motor 140 to operate in a third mode or to be powered off. In the third mode, only a fundamental current required by the non-heating motor to output a torque is input to the non-heating motor 140. There may be one or more non-heating motors 140, or all the motors 140) may be heating motors 140 configured to generate heat, and there is no non-heating motor 140. In this way, the non-heating motor 140 can be controlled to output a torque or to be powered off, thereby improving flexibility of control over the plurality of motors 140.

In some embodiments, step S140 may further include step S144. Step S144: Control efficiency of outputting a torque when the heating motor 140 operates in the second mode to be lower than efficiency of controlling the non-heating motor 140 to output a torque in the third mode. The efficiency of outputting a torque may be controlled by controlling a current input to the three phases of windings of the motor 140. Lower efficiency of outputting a torque by the motor 140 indicates greater heat generated when the torque is output. When the heating motor 140 operates in the second mode and needs to output a torque and generate heat, the heating motor 140 is controlled to output a torque at low efficiency, so that heat generation power of the heating motor 140 operating in the second mode can be increased.

In some embodiments, the control method may further include step S160. Step S160: Obtain a temperature value of the heating motor 140, and when the temperature of the heating motor 140 is higher than a first temperature threshold, send a third control instruction to the heating motor 140. The third control instruction is used to reduce the heat generation power of the heating motor 140, or control the heating motor 140 to switch from the first mode or the second mode to the third mode or to be powered off. In this way, when the temperature of the heating motor 140 is higher than the first temperature threshold, the temperature of the motor can be reduced by reducing the heat generation power of the heating motor 140 or controlling the heating motor 140 to switch to a non-heating motor 140, to prevent an insulation material on the surface of the three phases of windings from being damaged by an excessively high temperature of the motor 140, or prevent magnetic steel in the motor 140 from being demagnetized due to an excessively high temperature when the motor 140 is a permanent magnet motor.

A method embodiment of this application is described in detail above with reference to FIG. 2A, and an apparatus embodiment of this application is described in detail below with reference to FIG. 2B. It should be understood that the description of the method embodiment corresponds to the description of the apparatus embodiment. Therefore, for a part that is not described in detail in the apparatus embodiment, refer to the method embodiment.

Figure 2B:
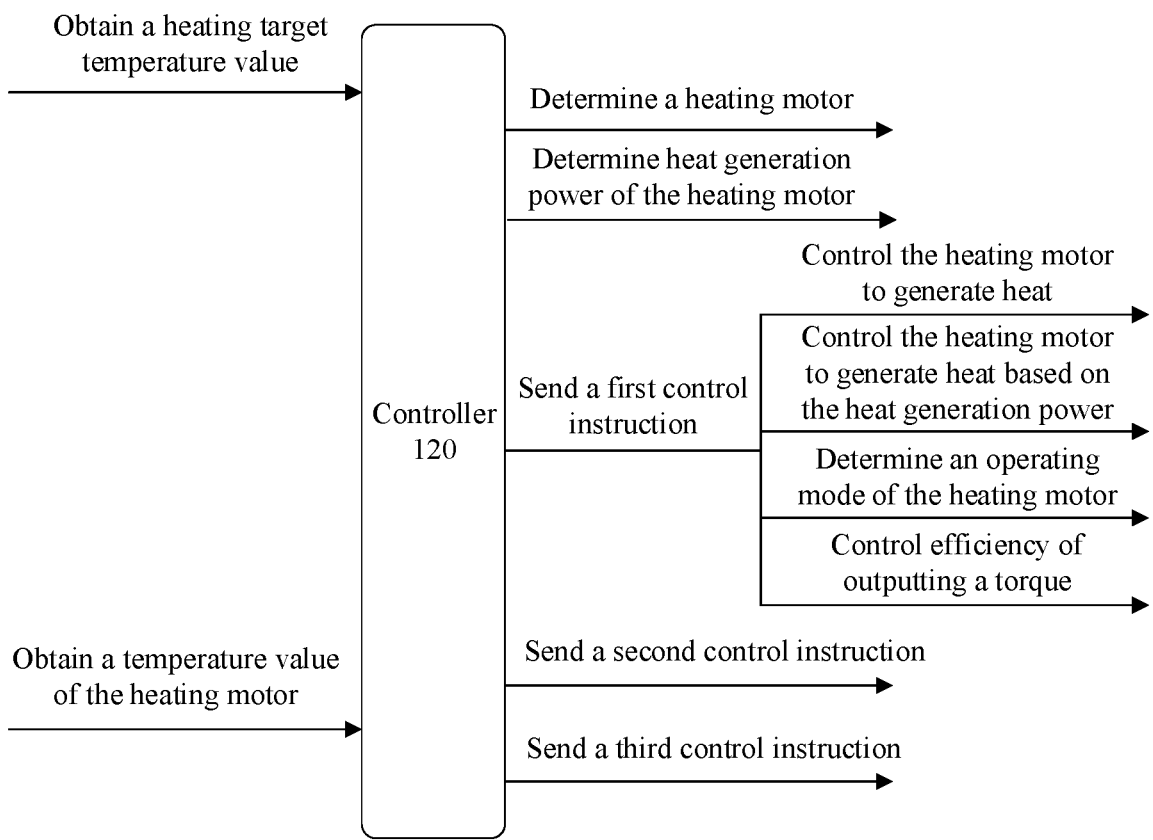
FIG. 2B is a schematic diagram of a controller according to an embodiment of this application.

FIG. 2B is a schematic diagram of a controller according to an embodiment of this application. As shown in FIG. 2B, an embodiment of this application provides a controller 120, configured to control a multi-motor drive system. The multi-motor drive system is a drive system including two or more motors 140. The controller 120 obtains a heating target temperature value. The controller 120 determines, based on the heating target temperature value, a heating motor 140 that needs to generate heat from the plurality of motors 140 of the multi-motor drive system. There are one or more heating motors that need to generate heat. The controller 120 sends a first control instruction to the heating motor 140. The first control instruction is used to cause the heating motor 140 to generate heat.

In some embodiment, the first control instruction is further used to cause the heating motor 140 to operate in a first mode or a second mode. In the first mode, harmonic currents are respectively input to three phases of windings of the heating motor 140, the harmonic currents in the three phases of windings have a same time phase, and the harmonic currents in the three phases of windings add up to zero. In the second mode, the harmonic currents are input while a fundamental current required by the heating motor 140 to output a torque is input to the three phases of windings of the heating motor 140.

In some embodiment, the controller is further configured to determine heat generation power of the heating motor 140 based on the heating target temperature value. The first control instruction is further used to cause the heating motor 140 to generate heat based on the heat generation power.

In some embodiment, the controller 120 sends a second control instruction to a non-heating motor 140 in the plurality of motors 140 other than the heating motor 140. The second control instruction is used to control the non-heating motor 140 to operate in a third mode or to be powered off. In the third mode, only a fundamental current required by the non-heating motor 140 to output a torque is input to the non-heating motor 140.

In some embodiment, the first control instruction is further used to control efficiency of outputting a torque when the heating motor 140 operates in the second mode to be lower than efficiency of controlling the non-heating motor 140 to output a torque in the third mode. In this way, waste heat generated when the heating motor 140 outputs a torque can be increased, thereby increasing heat generation power of the heating motor.

In some embodiment, when a temperature of the heating motor 140 is higher than a first temperature threshold, the controller 120 sends a third control instruction to the heating motor 140. The third control instruction is used to reduce the heat generation power of the heating motor 140, or control the heating motor 140 to switch from the first mode or the second mode to the third mode or to be powered off.

To describe the technical solutions in this application more clearly, the following describes in detail possible specific implementations of the control method, the controller 120, and the vehicle 10 in this application with reference to specific embodiments.

Embodiment 1

Figure 3:
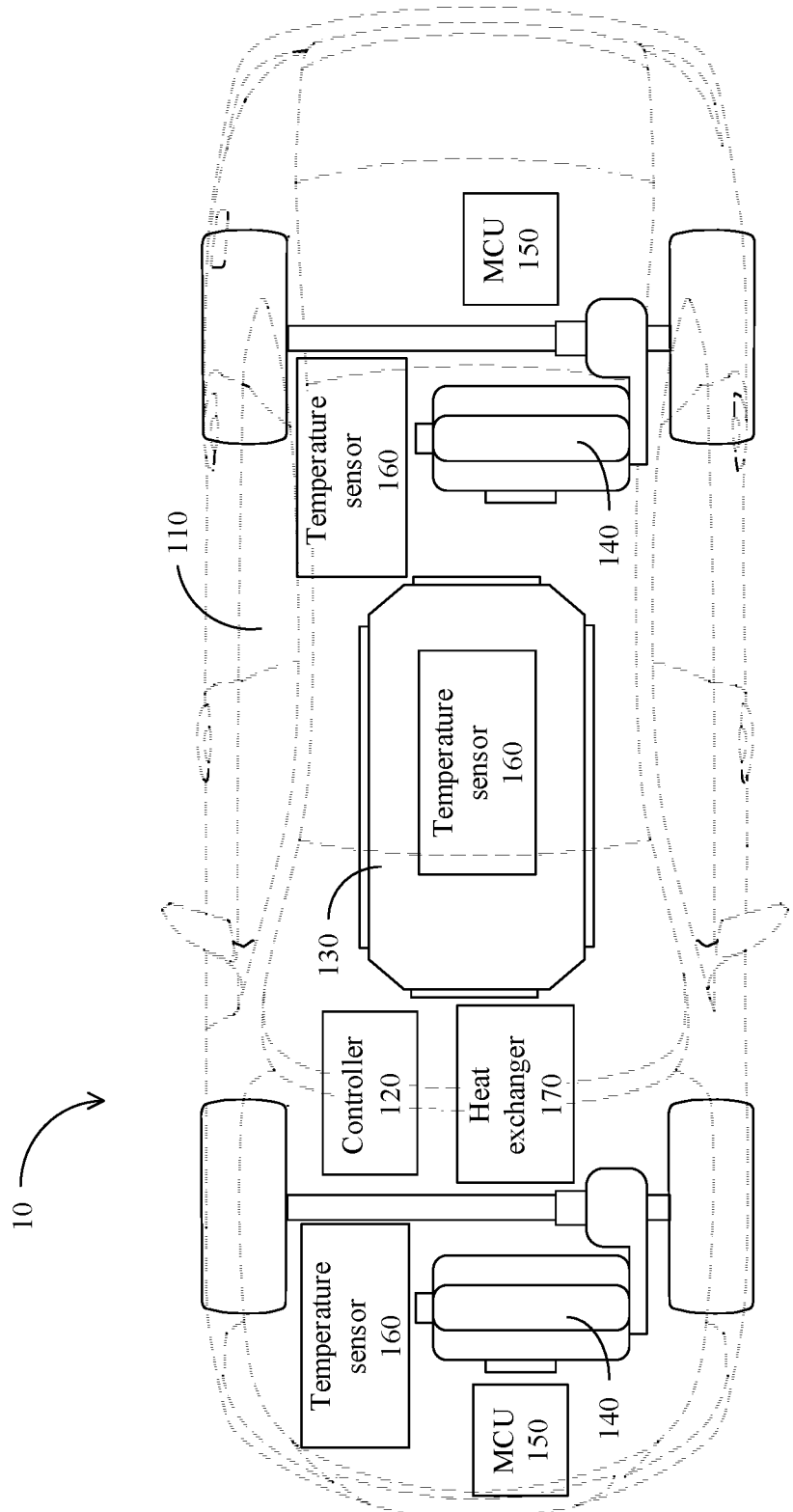
FIG. 3 is a schematic diagram of a vehicle according to an embodiment of this application.
Figure 4:
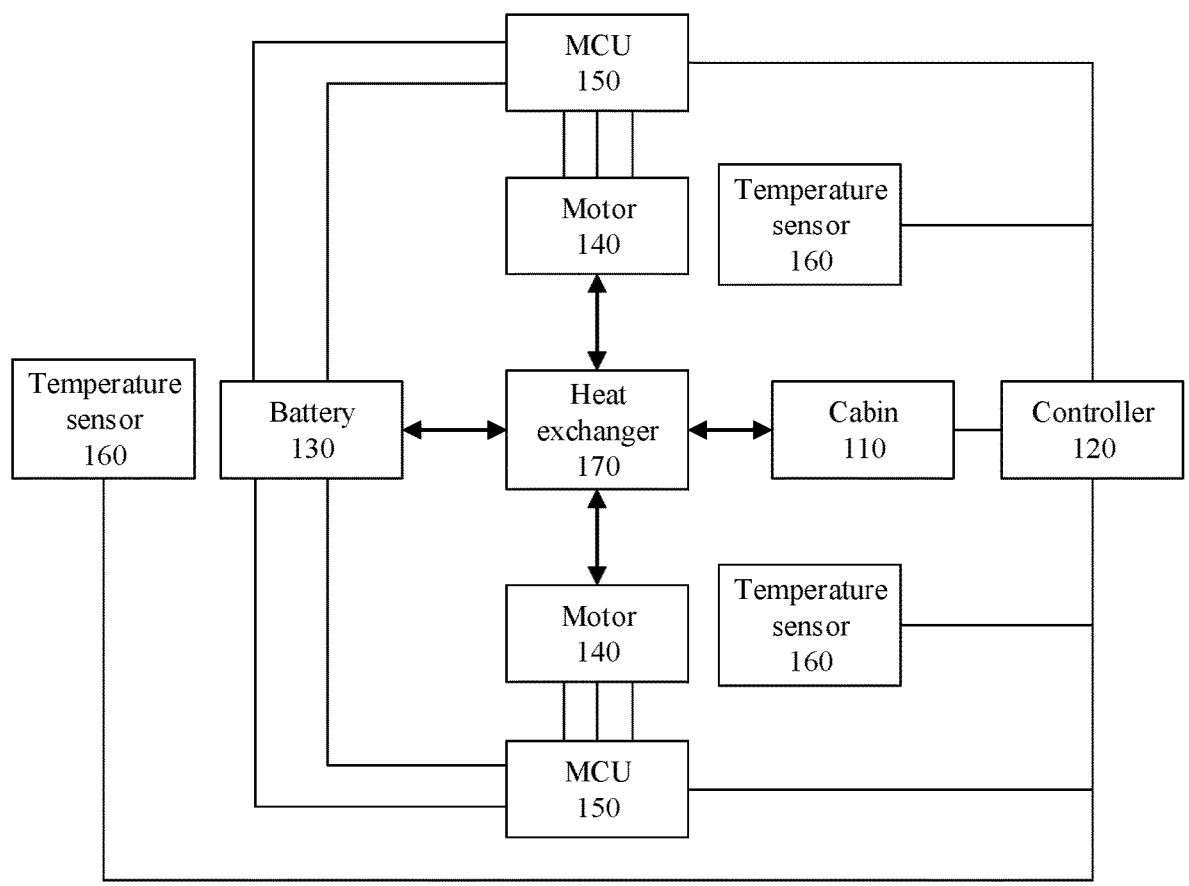
FIG. 4 is a schematic diagram of circuit and control connections in the vehicle in FIG. 3.

FIG. 3 is a schematic diagram of a vehicle 10 according to an embodiment of this application. FIG. 4 is a schematic diagram of circuit and control connections in the vehicle 10 in FIG. 3. As shown in FIG. 3 and FIG. 4, the vehicle 10 in this application may include a cabin 110, a controller 120, a battery 130, a motor 140, an MCU 150, a temperature sensor 160, and a heat exchanger 170.

The battery 130 is configured to supply electric energy to the motor 140, and the battery 130 may be disposed, for example, at a middle position of the bottom of the vehicle 10, or at any other suitable position. The cabin 110 is a space in which a driver and a passenger are located when driving or riding the vehicle 10, and the driver or the passenger may control the vehicle 10 in the cabin 110. There may be a plurality of motors 140. For example, two are shown in FIG. 3. One MCU 150 is disposed corresponding to each of the two motors 140, and the MCU 150 is electrically connected to the battery 130 and the motor 140. The MCU 150 can control the motor 140 by controlling a current input to the motor 140. There are a plurality of temperature sensors 160, respectively disposed at positions corresponding to the motor 140) and the battery 130, and configured to detect temperatures of the motor 140 and the battery 130. The controller 120 is connected to the MCU 150, so that the MCU 150 can be controlled, so as to control the motor 140. The controller 120 is connected to the temperature sensor 160, so that temperature information of the battery 130 and the motor 140 can be obtained by using the temperature sensor 160. The controller 120 may further receive a heating request signal that is sent by the driver and the passenger in the cabin 110 by using a touch display, a control button, a knob, or other means. The controller 120 may further receive a remote heating request signal sent by a terminal device such as a mobile phone, a computer, or a remote vehicle control key. A manner in which the driver and the passenger send a control signal to the controller 120 is not limited herein. The heat exchanger 170 is configured to enable the motor 140 to exchange heat with a to-be-heated object such as the battery 130 and the cabin 110, so that the battery 130 and the cabin 110 can be heated by using heat generated by the motor 140.

One of the two motors 140 is disposed at the front of the vehicle 10 and connected to two front wheels of the vehicle 10, and the other motor 140 is disposed at the rear of the vehicle 10 and connected to two rear wheels of the vehicle 10. In this way, at least one of the two motors 140 outputs a torque to drive the vehicle 10 to run.

Figure 5:
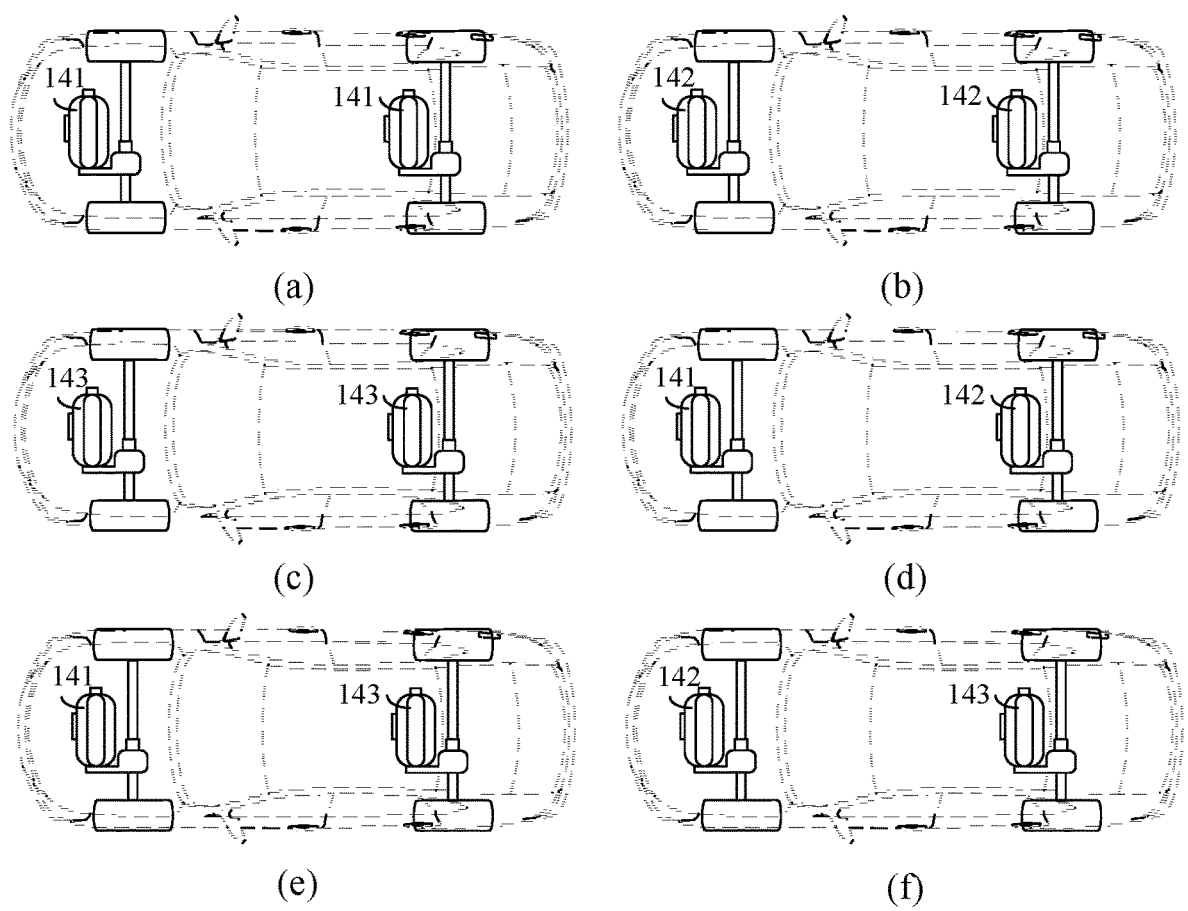
FIG. 5 is a schematic diagram of a possible combination form of motors in FIG. 3.

FIG. 5 is a schematic diagram of a possible combination form of the motors 140 in FIG. 3. As shown in FIG. 5, the motor 140 may be a permanent magnet motor 141, an electrically excited motor 142, or an asynchronous motor 143, or may be a motor 140 of any other type disposed inside the vehicle 10. A combination form of the two motors 140 in the vehicle 10 may be: As shown in (a), (b), and (c) of FIG. 5, the two motors 140 are both of a same type, which are both permanent magnet motors 141, electrically excited motors 142, or asynchronous motors 143. Alternatively, as shown in (d), (e), and (f) of FIG. 5, the two motors 140 may be of different types, which may have three combination forms: the permanent magnet motor 141+the electrically excited motor 142, the permanent magnet motor 141+the asynchronous motor 143, and the electrically excited motor 142+the asynchronous motor 143. In addition, a type of the motor 140 driving the front or rear wheels is not limited.

The controller 120 controls the motor 140 by using the MCU 150, and may control the motor 140 to be in four modes. In a first mode, the motor 140 is controlled to generate heat based on specified heat generation power without outputting a torque. In a second mode, the motor 140 generates heat based on specified heat generation power and outputs a torque. In a third mode, the motor 140 is not controlled to generate heat, but the motor is controlled to output a torque. The controller 120 may further control, by using the MCU 150, the motor 140) to be in a power-off state, so that the motor 140) neither generates heat nor outputs a torque. Specific manners in which the controller 120 controls, by using the MCU 150, the motor 140) to be in the three modes are described in detail later.

The motor 140 may include a stator that remains stationary and a rotatable rotor. Three phases of windings are disposed on the stator, which are completely symmetrical in structure, and differ 120° from each other in spatial position. After energization, currents $I_A$, $I_B$, and $I_C$ are respectively generated in the three phases of windings. The currents $I_A$, $I_B$, and $I_C$ in the three phases of windings may be controlled by using the MCU 150, so that the motor is in the first mode, the second mode, or the third mode, or is powered off.

When the MCU 150 controls the motor 140 to be in the third mode so that the motor 140 only outputs a torque, the MCU 150 controls the currents $I_A$, $I_B$, and $I_C$ in the three phases of windings to form three phases of symmetrical alternating currents (a fundamental current), and controls the phases of currents to differ 120° from each other in time phase. In this way, the alternating currents in the windings can respectively form alternating pulsed magnetic fields. Because the three phases of alternating currents differ by a 120° angle from each other in time phase, and the three phases of windings also differ by a 120° angle in space phase, a combined magnetic field of the three pulsed magnetic fields is a rotating magnetic field.

The rotor can generate a rotor magnetic field, and different types of motors 140 generate a rotor magnetic field in different manners. For example, the permanent magnet motor 141 generates a rotor magnetic field by disposing a permanent magnet material on the rotor. The electrically excited motor 142 forms a rotor magnetic field by inputting a direct current $I_{DC}$ to the rotor. The rotor in the asynchronous motor 143 generates an induced current through electromagnetic induction under the action of the rotating magnetic field, to form a rotor magnetic field.

The rotating magnetic field interacts with the rotor magnetic field to form a permanent magnet torque (or an electromagnetic torque). A direct axis and a quadrature axis of the rotor have different magnetic resistance, and a magnetic flux preferentially passes through a path with minimum magnetic resistance. Therefore, the magnetic flux is biased on the direct axis and the quadrature axis, so that a reluctance torque is formed. The rotor rotates in the rotating magnetic field, and the permanent magnet torque and the reluctance torque together form a torque output by the motor.

The currents $I_A$, $I_B$, and $I_C$ in the three phases of windings are projected onto the direct axis (d axis) and the quadrature axis (q axis) through Park transformation, and converted into d-axis currents $I_d$ and q-axis currents $I_q$. The d-axis current $I_d$ is mainly used to adjust the rotating magnetic field, and the q-axis current $I_q$ is mainly used to adjust the torque. A magnitude of the permanent magnet torque is proportional to that of the q-axis current $I_q$, and the reluctance torque is proportional to a product of the d-axis current $I_d$ and the q-axis current $I_q$. The controller 120 may send values of the d-axis current $I_d$ and the q-axis current $I_q$ to the MCU 150, and the MCU 150 may convert the values of the d-axis current $I_d$ and the q-axis current $I_q$ into values of the currents $I_A$, $I_B$, and $I_C$ in the three phases of windings, and control the currents in the three phases of windings based on a result obtained after the conversion, to control the magnetic field and the torque of the motor 140.

For the first mode, the controller 120 may control the MCU 150 to input harmonic currents to the three phases of windings of the motor 140, so that the vehicle 10 can generate heat in a stationary state (the motor 140 does not rotate). The harmonic current may be a sinusoidal harmonic or a cosine harmonic. The cosine harmonic is used as an example. The harmonic currents may be input to the three phases of windings of the motor 140 in either of the following two manners, which are specifically as follows:

In a manner (1), the harmonic currents input to the three phases of windings of the motor 140 are as follows:

$$\begin{cases} I_A = I\cos\omega t \\ I_B = -\frac{1}{2}I\cos\omega t \\ I_C = -\frac{1}{2}I\cos\omega t \end{cases}$$

In this way, because the currents $I_A$, $I_B$, and $I_C$ in the three phases of windings all include cosωt, the currents $I_A$, $I_B$, and $I_C$ in the three phases of windings are alternating currents, so that each phase of winding can generate a pulsed magnetic field, to generate a copper loss and a core loss, and cause both the stator and the rotor of the motor 140 to generate heat, thereby increasing heat generation power of the motor 140 and achieving more even heat generation of the motor 140. In addition, because the currents $I_A$, $I_B$, and $I_C$ in the three phases of windings all include cosωt, that is, the currents $I_A$, $I_B$, and $I_C$ in the three phases of windings are the same in time phase, a combined magnetic field of the three pulsed magnetic fields cannot form a rotating magnetic field, and the rotor cannot rotate.

Because the currents in the three phases of windings are $I_A+I_B+I_C=0$, the three phases of windings differ 120° in space phase, and $I_B=I_C$, after the currents $I_A$, $I_B$, and $I_C$ in the three phases of windings are projected onto dq-axis coordinates, q-axis currents $I_q$ obtained by projecting the current $I_B$ and the current $I_C$ onto the q axis add up to zero. In this way, both the permanent magnet torque and the reluctance torque of the rotor of the motor 140 are zero, that is, the rotor of the motor 140 does not output a torque.

In this way, the motor 140 can generate a copper loss by using the currents $I_A$, $I_B$, and $I_C$ in the three phases of windings, so that the three phases of windings generate heat; and can further generate a core loss by using the pulsed magnetic field formed by each phase of winding, so that the rotor generates heat, thereby increasing heat generation power of the motor 140 and achieving more even heat generation of the motor 140.

In another possible implementation, when the MCU 150 controls the motor to be in the first mode to generate heat, the controller 120 may alternatively control the MCU 150 to input d-axis harmonics to the motor 140, which are specifically as follows:

In a manner (2), d-axis harmonic currents input to the three phases of windings of the motor 140 are as follows:

$$\begin{cases} I_A = I_d\cos\omega t \\ I_B = -\frac{1}{2}I_d\cos\omega t \\ I_C = -\frac{1}{2}I_d\cos\omega t \end{cases}$$

In this way, the harmonic currents input to the three phases of windings of the motor 140 include only d-axis currents $I_d$, and q-axis currents $I_q$ are zero. A magnitude of the permanent magnet torque is proportional to that of the q-axis current $I_q$, and the reluctance torque is proportional to a product of the d-axis current $I_d$ and the q-axis current $I_q$. Therefore, only the d-axis harmonic currents are input to the three phases of windings of the motor 140, so that it can be further ensured that both the permanent magnet torque and the reluctance torque of the rotor of the motor 140 are zero, and the rotor of the motor 140 does not output a torque. This can avoid that, when the MCU 150 controls the currents $I_A$, $I_B$, and $I_C$ in the three phases of windings, due to a control precision problem, q-axis currents $I_q$ sometimes may not add up to zero, thereby causing the motor 140 to generate a permanent magnet torque and causing the motor 140 to jitter. This can further avoid that, when the d-axis harmonic currents are input to the three phases of windings of the motor 140, a q-axis current $I_q$ may be not zero due to another harmonic current, thereby causing the motor 140 to generate a permanent magnet torque and causing the motor 140 to jitter.

Further, for the electrically excited motor 142, when the electrically excited motor 142 is in the first mode, an exciting current $I_F=I_{DC}$ may be input to the rotor, so that a copper loss is generated in the rotor and the rotor generates heat, to increase heat generation power of the electrically excited motor 142.

For the first mode, when the vehicle 10 is in a running state (the motor 140 rotates), based on a type of the motor 140, the controller 120 may alternatively control the MCU 150 to input only a d-axis current $I_d$ to the motor 140, so that the motor 140 is in the first mode. A specific manner may be any one of the following manners:

In a manner (3), for the permanent magnet motor 141, under the control of the MCU 150, a q-axis current of the permanent magnet motor 141 is zero, that is, $I_q=0$, so that a torque of the rotor is zero. A d-axis current is input to the permanent magnet motor 141, that is, $I_d≠0$, so that an alternating magnetic field is generated in the permanent magnet motor 141, thereby generating a copper loss and a core loss, and generating heat at some power. In this case, the permanent magnet motor 141 is idling without generating a torque, and the rotor keeps rotating at a rotational speed.

In a manner (4), for the electrically excited motor 142, under the control of the MCU 150, a q-axis current of the electrically excited motor 142 is zero, that is, $I_q=0$, so that a torque of the rotor is zero. Only a d-axis current is input to the electrically excited motor 142, that is, $I_d≠0$, so that an alternating magnetic field is generated in the electrically excited motor 142, thereby generating a copper loss and a core loss, and generating heat at some power. At the same time, an exciting current $I_F$ is input to the rotor, so that a copper loss is generated in the rotor and the rotor generates heat, but no constant torque is generated.

In a manner (5), for the asynchronous motor 143, under the control of the MCU 150, a quadrature-axis (which may alternatively be referred to as T-axis) current of the asynchronous motor 143 is zero, that is, $I_q=0$, so that a torque of the rotor is zero. Only a direct-axis (which may alternatively be referred to as M-axis) current is input to the asynchronous motor 143, that is, $I_d≠0$, so that an alternating magnetic field is generated in the asynchronous motor 143, and the asynchronous motor 143 can generate a copper loss and a core loss, and generate heat at some power. In this case, the asynchronous motor 143 is idling without generating a torque, and the rotor keeps rotating at a rotational speed.

For the second mode, when the vehicle 10 is in the running state, the controller 120 may control the MCU 150 to input harmonic currents to the motor 140 on the basis of inputting, to the motor 140, a fundamental current required by the motor 140 to output a torque, so that the motor 140 generates an additional copper loss and core loss, and generates heat at some power. In this way, the motor 140 is in the second mode. A specific manner of inputting the harmonic currents to the motor 140 is the same as the foregoing manners (1) and (2), and details are not described herein again. Because the harmonic currents input in the foregoing manner (1) or (2) do not generate a rotating magnetic field or cause the rotor to generate a torque, the input harmonic currents cause the motor 140 to generate heat, but do not affect rotation or torque output of the motor 140. In this way, even when rotating and outputting a torque, the motor 140 can still generate heat to heat the to-be-heated object such as the battery 130 or the cabin 110.

Further, at a same rotational speed and torque, the motor 140 corresponds to a plurality of combinations of q-axis currents $I_q$ and d-axis currents $I_d$. Because a current amplitude in the three phases of windings is $i_s = \sqrt{I_d^2 + I_q^2}$, a smaller current amplitude is indicates higher efficiency of outputting a torque by the motor 140. One of the plurality of combinations of q-axis currents $I_q$ and d-axis currents $I_d$ has a minimum current amplitude, that is, a current required by the motor 140 to output the same torque is minimum, and efficiency of outputting the torque by the motor 140 is the highest. Inputting a q-axis current $I_q$ and a d-axis current $I_d$ in the combination to the motor 140 may be referred to as an efficient control manner. Generally, when the vehicle 10 is running, the MCU 150 controls the motor 140 to run in the efficient control manner, to improve utilization of electric energy, reduce a heat loss of the motor 140), and increase a driving range of the vehicle 10. For the vehicle 10 in this embodiment of this application, to increase heat generation power, the combination of the q-axis current $I_q$ and the d-axis current $I_d$ with the highest efficiency at the same rotational speed and torque may be not selected for the motor 140, but another combination of a q-axis current $I_q$ and a d-axis current $I_d$ is selected to control the motor 140, so that a current amplitude is greater than the current amplitude of the motor 140 in the efficient control manner, and a current required by the motor 140 to generate the same torque is greater, resulting in that efficiency of outputting the torque by the motor 140 is lower than that in the efficient control manner. This may be referred to as an inefficient control manner. In this way, when the motor 140 is required to supply heat generation power, the motor 140 may be controlled by using the MCU 150 to operate in the inefficient control manner, to increase the heat loss of the motor 140 and increase the heat generation power of the motor 140.

For the third mode, the controller 120 may control the MCU 150 to normally input, to the motor 140, a fundamental current required by the motor 140 to output a torque, so that the motor only outputs a torque. In this way, the motor 140 is in the third mode. It should be noted that, when the motor 140 outputs a torque in the third mode, the motor 140) does not generate heat, but waste heat is generated when the torque is output. When the motor 140 is in the third mode, the combination of the q-axis current $I_q$ and the d-axis current $I_d$ with the highest efficiency is selected and input to the motor 140, so as to reduce generated waste heat and improve utilization of electric energy.

In conclusion, when the vehicle 10 is in a low-temperature environment such as winter, in a first case, the controller 120 may determine a heating motor 140 that needs to generate heat and a non-heating motor 140 that does not need to generate heat in the plurality of motors 140, and determine heat generation power of the heating motor 140.

The first case includes but is not limited to: After the driver enters the cabin 110 and starts the vehicle 10, the temperature sensor 160 may detect a temperature of the battery 130, and send the detected temperature to the controller 120, and the controller 120 determines that the temperature of the battery 130 is lower than a second temperature threshold. Alternatively, the driver remotely starts the vehicle 10 by using a terminal device such as a mobile phone, a computer, or a remote vehicle control key, so that the vehicle 10 is in a preparation stage, and the vehicle 10 can be in an optimal state when the driver drives the vehicle 10. Alternatively, the driver or the passenger in the cabin 110 sends a control signal by using a touch display, a control button, a knob, or other means in the cabin 110, to control the cabin 110 to be heated.

There may be one or more heating motors 140, and a quantity of non-heating motors 140 may be zero. The controller 120 controls the MCU 150 to cause the heating motor 140 to be in the first mode and cause the non-heating motor 140 to be powered off. When the driver controls the vehicle 10 to run, a torque required to be output by the motor 140 is relatively small in a starting stage of the vehicle 10. The controller 120 may control the heating motor 140 to be in the first mode and control the non-heating motor 140 to be in the third mode. In this way, heat may be supplied by the heating motor 140 and a torque may be supplied by the non-heating motor 140. The controller 120 does not need to control the heating motor 140 to be in the second mode, which can reduce control pressure of the controller 120, and prevent control accuracy from being affected by controlling the heating motor 140 to output a torque and generate heat at the same time. When the driver controls the vehicle 10 to run at a high speed, the controller 120 may control the heating motor 140 to be in the second mode and control the non-heating motor 140 to be in the third mode. In this way, both the heating motor 140 and the non-heating motor 140 can be controlled to output a torque, so that the vehicle 10 can run at a high speed. A quantity of heating motors 140 may be further adjusted based on heat required by the battery 130 and/or the cabin 110, to adjust heat generation power. In this way, heat generated by the heating motor 140 can be transferred to the battery 130 and/or the cabin 110 through the heat exchanger 170, thereby improving charging and discharging performance of the battery 130 in a low-temperature environment and improving comfort for personnel in the cabin 110.

When the temperature sensor 160 detects that a temperature of the heating motor 140 is higher than a first temperature threshold, an insulation material on the surface of the three phases of windings may be damaged by an excessively high temperature of the heating motor 140. When the heating motor 140 is the permanent magnet motor 141, magnetic steel in the permanent magnet motor 141 may be demagnetized (also referred to as degaussed, which refers to a process in which a magnet returns to a magnetic neutral state) due to an excessively high temperature of the permanent magnet motor 141. In this case, the controller 120 may re-determine heat generation power of the heating motor 140, to reduce the heat generation power of the heating motor 140, so as to reduce the temperature of the heating motor 140 and prevent the heating motor 140 from being damaged due to an excessively high temperature. Alternatively, the controller 120 may re-determine a heating motor 140 configured to generate heat, so that the original heating motor 140 is switched from the first mode or the second mode to the third mode or is powered off as a non-heating motor 140, and the original non-heating motor 140 is switched from the third mode or the power-off state to the first mode or the second mode as a heating motor 140. In this way, the original heating motor 140 configured to generate heat does not generate heat, thereby reducing the temperature and preventing the motor 140 from being damaged due to an excessively high temperature.

Embodiment 2

Figure 6:
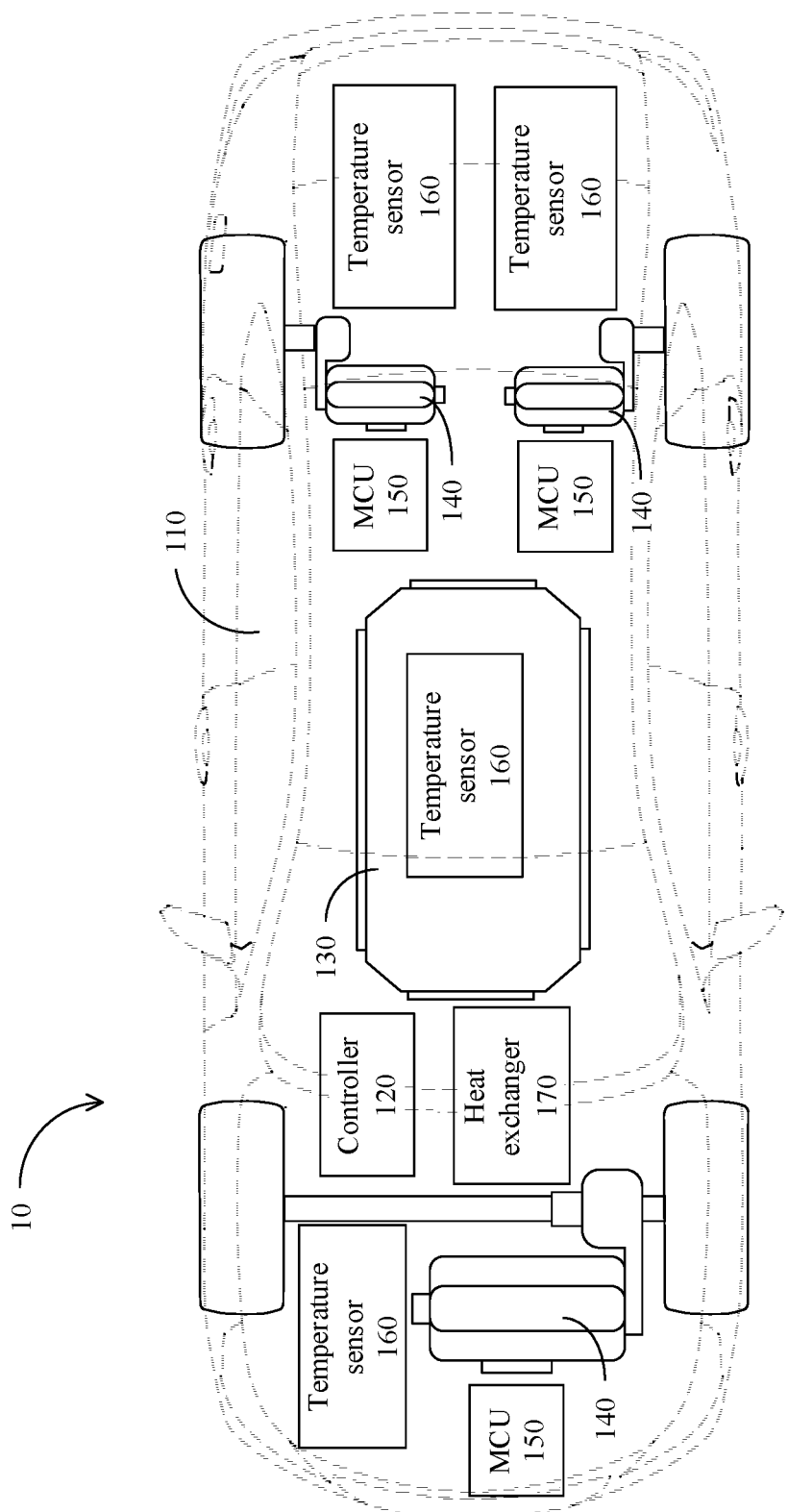
FIG. 6 is a schematic diagram of another vehicle according to an embodiment of this application.

FIG. 6 is a schematic diagram of another vehicle 10 according to an embodiment of this application. As shown in FIG. 6, a difference between the vehicle 10 in Embodiment 2 and that in Embodiment 1 lies in that the vehicle 10 in Embodiment 2 includes three motors 140. One of the motors 140 is disposed at the front of the vehicle 10, connected to two front wheels of the vehicle 10, and configured to drive the two front wheels of the vehicle 10 to rotate. The other two motors 140 are disposed at the rear of the vehicle 10. The two motors 140 are each connected to one rear wheel of the vehicle 10, and configured to drive the rear wheel of the vehicle 10 to rotate. Alternatively, one motor 140 may be disposed at the rear of the vehicle 10 and connected to the two rear wheels of the vehicle 10, and the other two motors 140 may be disposed at the front of the vehicle 10 and each connected to one front wheel of the vehicle 10. This is not limited.

Figure 7:
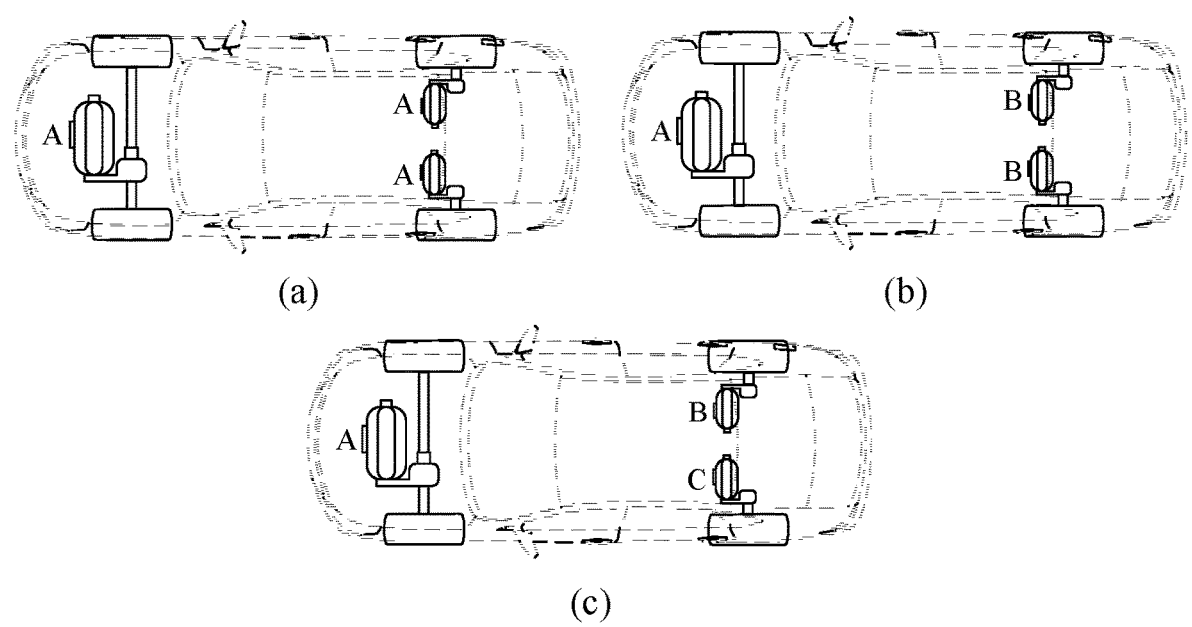
FIG. 7 is a schematic diagram of a possible combination form of motors in FIG. 6.

FIG. 7 is a schematic diagram of a possible combination form of the motors 140 in FIG. 6. As shown in FIG. 7, the motor 140 may be a permanent magnet motor 141, an electrically excited motor 142, or an asynchronous motor 143, or may be a motor 140 of any other type disposed inside the vehicle 10. The three motors 140 in the vehicle 10 may be each disposed as any one of the permanent magnet motor 141, the electrically excited motor 142, or the asynchronous motor 143. In this way, a combination form of the three motors 140 in the vehicle 10 may be: As shown in (a) of FIG. 7, the three motors 140 are disposed as motors 140 of a same type, which are all permanent magnet motors 141, electrically excited motors 142, or asynchronous motors 143. Alternatively, as shown in (b) of FIG. 7, the three motors 140 may include two types of motors 140, which are disposed as two motors 140 of a same type and the other motor 140 of a different type. Alternatively, as shown in (c) of FIG. 7, the three motors 140 are disposed with types different from each other. It should be noted that A, B, and C in FIG. 7 do not refer to a motor 140 of a particular type, and are only used to distinguish whether the types of the motors 140 are the same.

Embodiment 3

Figure 8:
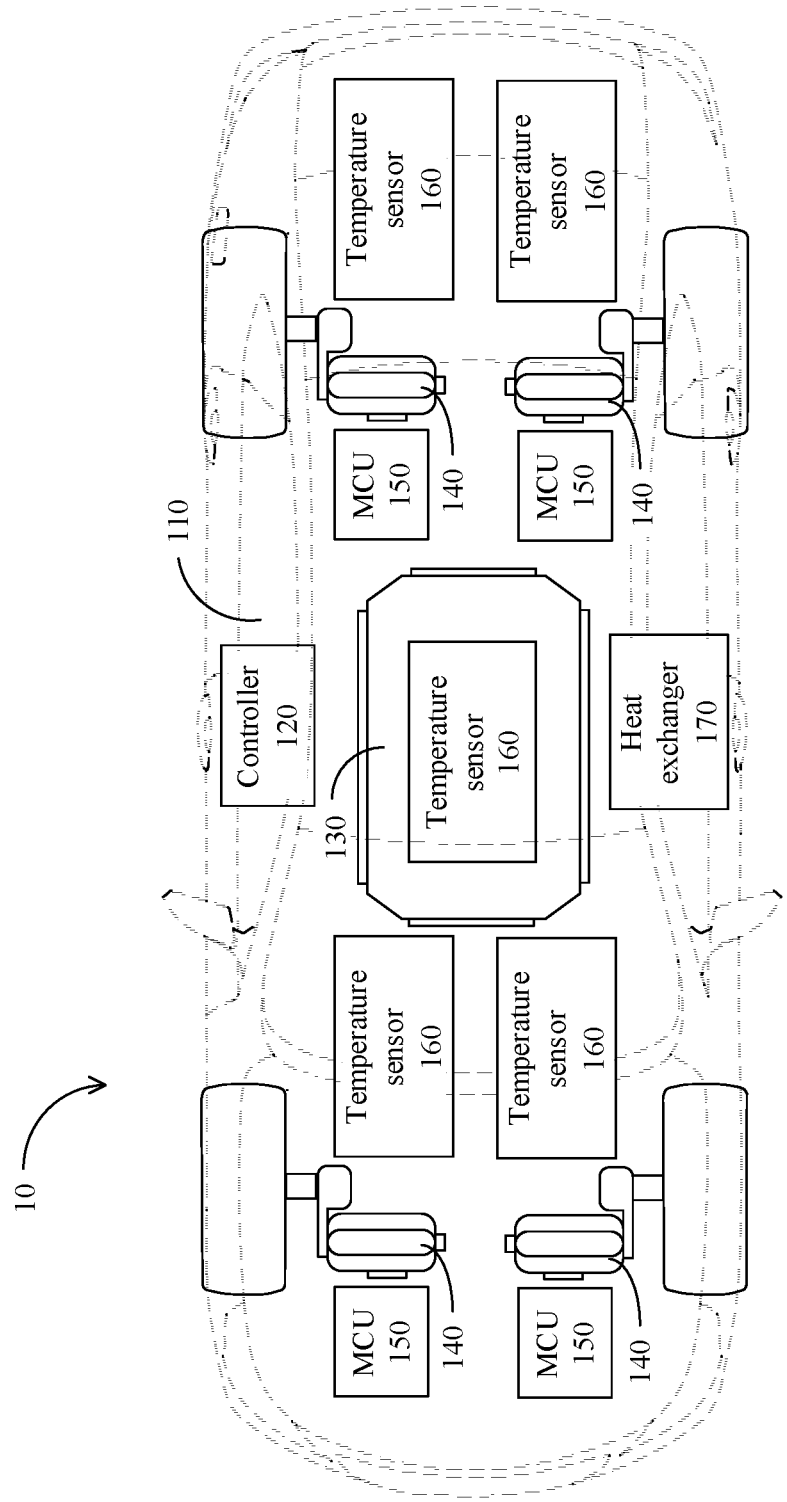
FIG. 8 is a schematic diagram of a third vehicle according to an embodiment of this application.

FIG. 8 is a schematic diagram of a third vehicle 10 according to an embodiment of this application. As shown in FIG. 8, a difference between the vehicle 10 in Embodiment 3 and that in Embodiment 1 lies in that the vehicle 10 in Embodiment 3 includes four motors 140. Two of the motors 140 are disposed at the front of the vehicle 10. The two motors 140 at the front are respectively connected to two front wheels of the vehicle 10, and configured to drive the two front wheels of the vehicle 10 to rotate. The other two motors 140 are disposed at the rear of the vehicle 10. The two motors 140 at the rear are each connected to one rear wheel of the vehicle 10, and configured to drive the rear wheel of the vehicle 10 to rotate.

Figure 9:
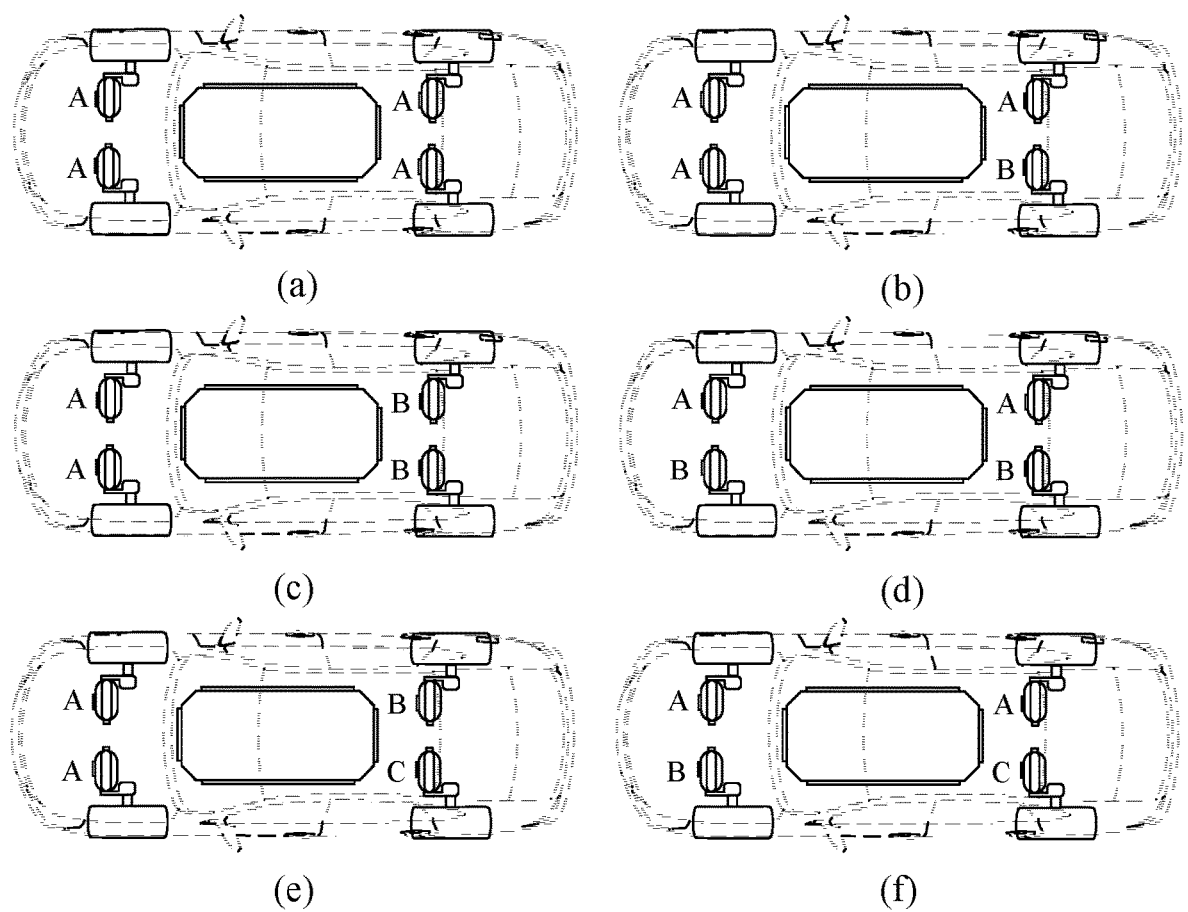
FIG. 9 is a schematic diagram of a possible combination form of motors in FIG. 8.

FIG. 9 is a schematic diagram of a possible combination form of the motors 140 in FIG. 8. The motor 140 may be a permanent magnet motor 141, an electrically excited motor 142, or an asynchronous motor 143, or may be a motor 140 of any other type disposed inside the vehicle 10. The four motors 140 in the vehicle 10 may be each disposed as any one of the permanent magnet motor 141, the electrically excited motor 142, or the asynchronous motor 143. In this way, a combination form of the four motors 140 in the vehicle 10 may be: As shown in (a) of FIG. 9, the four motors 140 are disposed with a same type, which are all permanent magnet motors 141, electrically excited motors 142, or asynchronous motors 143. Alternatively, as shown in (b) of FIG. 9, the four motors 140 may include two types of motors 140, which are disposed as three motors 140 of a same type and the other motor 140 of a different type. Alternatively, as shown in (c) and (d) of FIG. 9, the four motors 140 may include two types of motors 140, which are disposed as two motors 140 of a same type and the other two motor 140 of another same type. In addition, two motors 140 driving front and rear wheels may be disposed with a same or different types. Alternatively, as shown in (e) and (f) of FIG. 9, the four motors 140 may include three types of motors 140, which are disposed as two motors 140 of a same type and the other two motor 140 of other different types. In addition, two motors 140 driving front and rear wheels may be disposed with a same type, or two motors 140 of a same type respectively drive one front wheel and one rear wheel.

Further, in this embodiment of this application, a quantity of motors 140 is not limited to two, three, or four. In the vehicle 10 in this application, the quantity of motors 140 may be any quantity greater than or equal to two.

Embodiment 4

Based on the vehicle 10 in the embodiments of this application, this application further provides a control method, so that the plurality of motors 140 in the vehicle 10 can be controlled to generate heat. The following describes in detail specific steps of the control method in this application with reference to an accompanying drawing.

Figure 10:
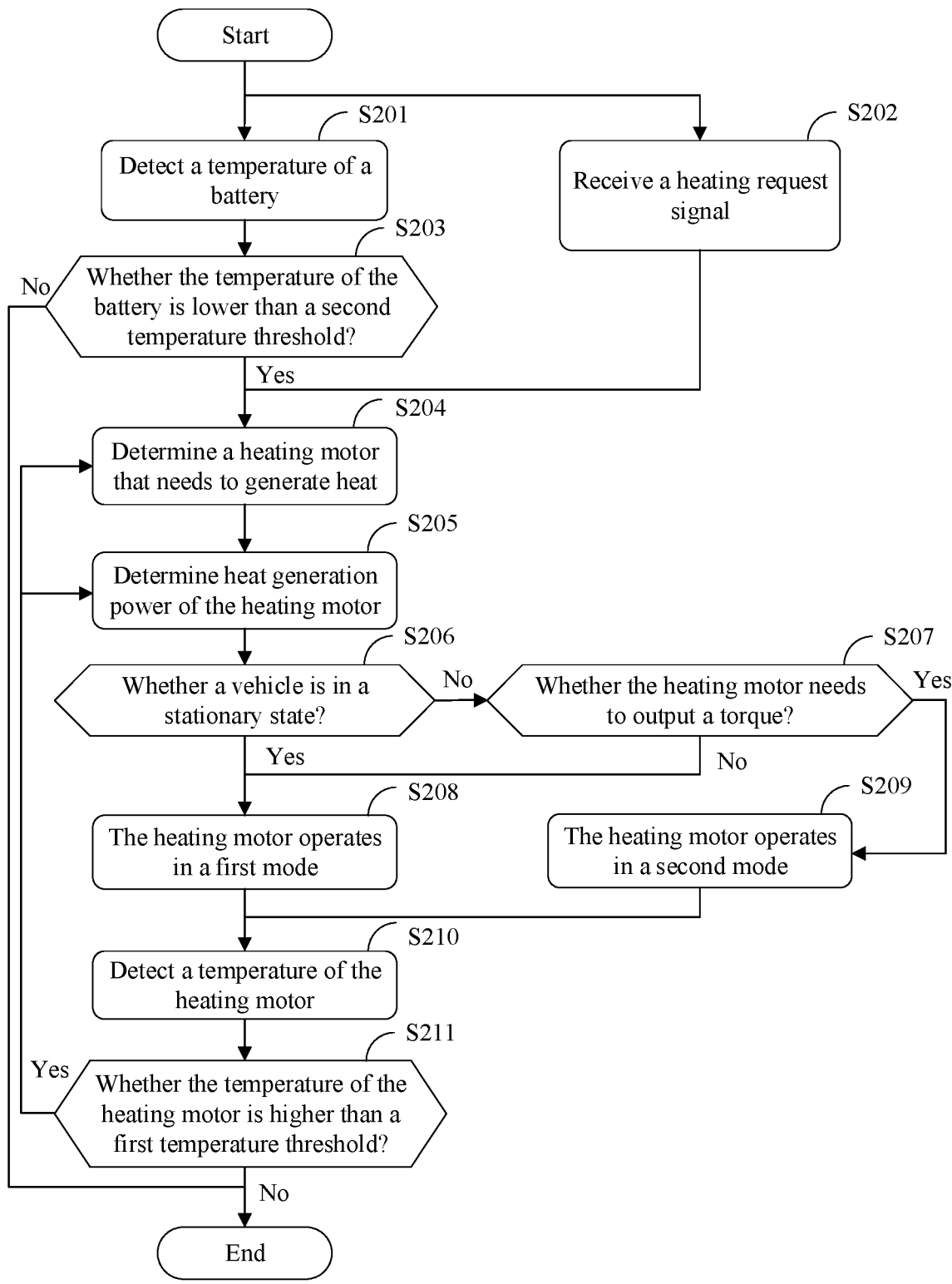
FIG. 10 is a flowchart of a control method according to an embodiment of this application.

FIG. 10 is a flowchart of a control method according to an embodiment of this application. As shown in FIG. 10, in the control method in this embodiment of this application, specific steps of controlling the plurality of motors 140 to generate heat are as follows: Step S201: Detect a temperature of the battery 130.

After the vehicle 10 is started, for example, after the driver enters the cabin 110 and starts the vehicle 10, or after the driver starts the vehicle 10 by using a remote terminal device such as a mobile phone, a computer, or a remote control vehicle key, the temperature of the battery 130 is detected by using the temperature sensor 160.

Step S202: Receive a heating request signal. The request signal includes a heating target temperature value.

The heating request signal received by the controller 120 may be, for example, a heating request signal that is sent by the driver or the passenger in the cabin 110 by using a touch display, a control button, a knob, or other means, a remote heating request signal that is sent by the driver by using a terminal device such as a mobile phone, a computer, or a remote vehicle control key. A manner in which the driver and the passenger send the heating request signal is not limited herein. In this case, a heating motor 140 that needs to generate heat is determined.

Step S203: Determine that the temperature of the battery 130 is lower than a second temperature threshold.

If the temperature of the battery 130 is lower than the second temperature threshold, it indicates that the temperature of the battery 130 is excessively low; which reduces charging and discharging performance of the battery 130, and leads to a great decrease in endurance of the vehicle 10, and the battery 130 needs to be heated. In this case, the controller 120 may extract a prestored heating target temperature value. The heating target temperature value is greater than or equal to the second temperature threshold of the battery 130.

If the temperature of the battery 130 is greater than or equal to the second temperature threshold, it indicates that the temperature of the battery 130 is normal, the battery 130 has sufficient charging and discharging performance, the vehicle 10 can obtain sufficient endurance, and the battery 130 does not need to be heated.

Step S204: Determine the heating motor 140 that needs to generate heat.

If relatively small heat generation power is required, only some motors 140 need to be distributed as heating motors 140 for heat generation. If relatively large heat generation power is required, all the motors 140 may be distributed as heating motors 140 for heat generation, to meet the heat generation requirement.

Step S205: Determine heat generation power of the heating motor 140.

Heat generation power of each motor 140 may be distributed based on power required for heat generation. The heat generation power may be evenly distributed, or different heat generation power may be distributed to heating motors 140 as required.

Step S206: Determine whether the vehicle 10 is in a stationary state.

If the vehicle 10 is in the stationary state, the motor 140 does not need to output a torque. If the vehicle 10 is in a running state, at least one motor 140 needs to output a torque.

Step S207: Determine whether the heating motor 140 needs to output a torque.

When the vehicle 10 is in the running state, it is determined whether the heating motor 140 needs to output a torque, so as to determine whether an operating mode of the heating motor 140 is a first mode or a second mode.

Step S208: When the vehicle 10 is in the stationary state or when the vehicle 10 is in the running state, but the heating motor 140 does not need to output a torque, the heating motor 140 operates in the first mode.

When the vehicle 10 is in the stationary state, the harmonic currents shown in the manner (1) or (2) are input to the heating motor 140. The harmonic currents can cause the heating motor 140 to generate pulsed magnetic fields, so as to generate a copper loss and a core loss for heat generation. In addition, the pulsed magnetic fields do not form a rotating magnetic field, the rotor does not generate a torque, and the rotor remains in a stationary state. In this way, the heating motor 140 can operate in the first mode, which generates heat in a stationary state but does not output a torque.

When the vehicle 10 is in the running state, a d-axis current $I_d$ is input to the heating motor 140 in a manner described in the manner (3), (4), or (5), and a q-axis current of the heating motor 140 is zero. In this way, the heating motor 140 can generate a rotating magnetic field, so that the heating motor 140 can generate a copper loss and a core loss for heat generation. In addition, the rotor of the heating motor 140 may be idling.

Step S209: When the vehicle 10 is in the running state and the heating motor 140 needs to output a torque, the heating motor 140 operates in the second mode.

The controller 120 may control the MCU 150 to input harmonic currents to the motor 140 in the manner (1) or (2) on the basis of inputting, to the motor 140, a fundamental current required by the motor 140 to output a torque, so that the motor 140 generates an additional copper loss and core loss, and generates heat at some power. Because the harmonic currents input in the foregoing manner (1) or (2) do not generate a rotating magnetic field or cause the rotor to generate a torque, the input harmonic currents cause the motor 140 to generate heat, but do not affect rotation or torque output of the motor 140. In this way, even when rotating and outputting a torque, the motor 140 can still generate heat.

Step S210: Detect a temperature of the heating motor 140.

After the heating motor 140 generates heat, the temperature sensor 160 detects the temperature of the heating motor 140 and sends the temperature to the controller 120.

Step S211: Determine whether the temperature of the heating motor 140 is higher than a first temperature threshold.

When the temperature of the heating motor 140 is higher than the first temperature threshold, the heat generation power of the heating motor 140 may be re-determined to reduce the heat generation power of the heating motor 140 with an excessively high temperature, so as to reduce the temperature of the heating motor 140, and prevent the heating motor 140 from being damaged due to the excessively high temperature.

When the temperature of the heating motor 140 is higher than the first temperature threshold, the heating motor 140 that needs to generate heat may be re-determined. The heating motor 140 may be switched to a non-heating motor 140, that is, the heating motor 140 is switched from the first mode or the second mode to the third mode or is powered off as a non-heating motor 140. In this way, the motor 140 with an excessively high temperature does not need to generate heat, thereby reducing the temperature of the motor 140 and preventing the motor 140 from being damaged.

In conclusion, according to the control method in this embodiment of this application, the temperature of the battery 130 can be detected after the vehicle 10 is started, and when the temperature of the battery 130 is lower than the second temperature threshold or a heating request signal is received, the controller 120 determines the heating motor 140 that needs to generate heat and heat generation power, so that a quantity of heating motors 140 and the heat generation power can be flexibly controlled.

Figure 11:
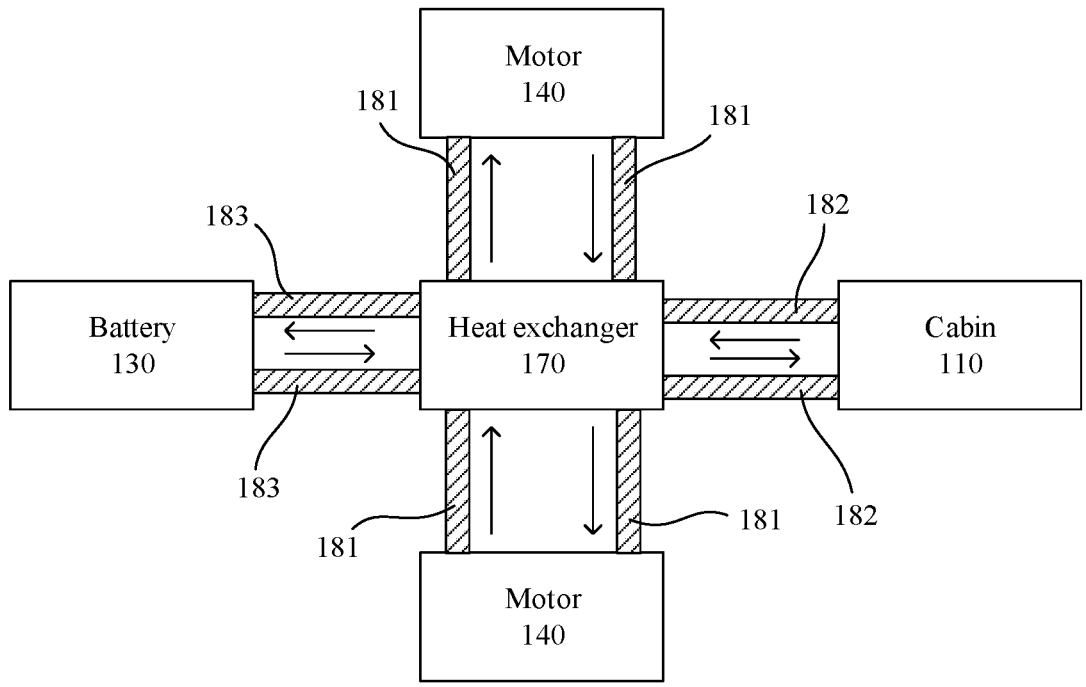
FIG. 11 is a schematic diagram of heating a cabin and a battery by a motor according to an embodiment of this application.

FIG. 11 is a schematic diagram of heating a cabin 110 and a battery 130 by a motor 140 according to an embodiment of this application. As shown in FIG. 11, a first circulation pipe 181 may be disposed between the motor 140 and the heat exchanger 170, a second circulation pipe 182 may be disposed between the cabin 110 and the heat exchanger 170, and a third circulation pipe 183 may be disposed between the battery 130 and the heat exchanger 170. The first circulation pipe 181, the second circulation pipe 182, and the third circulation pipe 183 are filled with coolant, and the coolant can circulate in the first circulation pipe 181, the second circulation pipe 182, and the third circulation pipe 183. In this way, heat generated by the heating motor 140 can be transferred to the coolant in the first circulation pipe 181, and the coolant circulates in the first circulation pipe 181, so that the heat can be transferred to the coolant in the second circulation pipe 182 and the third circulation pipe 183 through the heat exchanger 170, to increase a temperature of the coolant in the second circulation pipe 182 and the third circulation pipe 183. The coolant circulates in the second circulation pipe 182 and the third circulation pipe 183 to heat a to-be-object such as the battery 130 and/or the cabin 110.

In addition, when it is detected that a temperature of the heating motor 140 is higher than the first temperature threshold, heat generation power of the heating motor 140 may be further reduced or the heating motor 140 is switched to a non-heating motor 140, to reduce the temperature of the motor 140, and prevent the motor 140 from being damaged due to an excessively high temperature.

Embodiment 5

Figure 12:
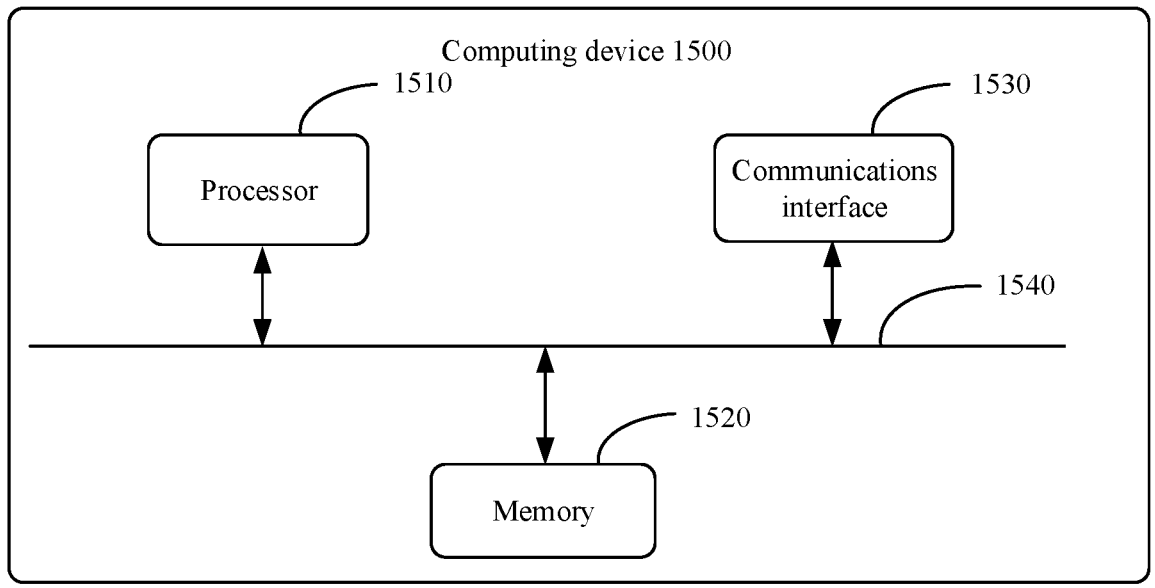
FIG. 12 is a schematic diagram of a structure of a computing device according to an embodiment of this application.

FIG. 12 is a schematic diagram of a structure of a computing device 1500 according to an embodiment of this application. The computing device 1500 includes a processor 1510, a memory 1520, a communications interface 1530, and a bus 1540.

It should be understood that the communications interface 1530 in the computing device 1500 shown in FIG. 15 may be configured to communicate with another device.

The processor 1510 may be connected to the memory 1520. The memory 1520 may be configured to store program code and data. Therefore, the memory 1520 may be a storage unit in the processor 1510, an external storage unit independent of the processor 1510, or a component including the storage unit in the processor 1510 and the external storage unit independent of the processor 1510.

Optionally, the computing device 1500 may further include a bus 1540. The memory 1520 and the communications interface 1530 may be connected to the processor 1510 through the bus 1540. The bus 1540 may be a peripheral component interconnect (PCI) bus, an extended industry standard architecture (EISA) bus, or the like. The bus 1540 may be classified into an address bus, a data bus, a control bus, and the like. For ease of representation, only one line is used to represent the bus in FIG. 15, but this does not mean that there is only one bus or only one type of bus.

It should be understood that in this embodiment of this application, the processor 1510 may be a central processing unit (CPU). The processor may be alternatively a general-purpose processor, a digital signal processor (DSP), an application-specific integrated circuit (ASIC), a field programmable gate array (FPGA) or another programmable logical device, a discrete gate or transistor logic device, or a discrete hardware component. The general-purpose processor may be a microprocessor, or the processor may be any conventional processor, or the like. Alternatively, the processor 1510 uses one or more integrated circuits to execute a related program, to implement the technical solutions provided in embodiments of this application.

The memory 1520 may include a read-only memory and a random access memory, and provide instructions and data to the processor 1510. A part of the processor 1510 may further include a non-volatile random access memory. For example, the processor 1510 may further store information of a device type.

When the computing device 1500 runs, the processor 1510 executes computer-executable instructions in the memory 1520 to perform operation steps of the foregoing method.

It should be understood that the computing device 1500 according to embodiments of this application may correspond to a corresponding execution body of the method according to embodiments of this application, and the foregoing and other operations and/or functions of modules in the computing device 1500 are separately intended to implement corresponding procedures of the methods in the embodiments. For simplicity, details are not described herein again.

A person of ordinary skill in the art may be aware that, units and algorithm steps in examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other similar forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The storage medium includes: any medium that can store program code, such as a USB flash drive, a removable hard disk, a read-only memory (ROM), a random access memory (RAM), a magnetic disk, or an optical disc.

An embodiment of this application further provides a computer-readable storage medium, storing a computer program. The program is executed by a processor to perform a method. The method includes at least one of the solutions described in the foregoing embodiments.

The computer storage medium according to embodiments of this application may be any combination of one or more computer-readable media. The computer-readable medium may be a computer-readable signal medium or a computer-readable storage medium. The computer-readable storage medium may be but is not limited to an electric, magnetic, optical, electromagnetic, infrared, or semiconductor system, apparatus, or device, or any combination thereof. More specific examples (a non-exhaustive list) of the computer-readable storage medium include an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this document, the computer-readable storage medium may be any tangible medium including or storing a program that may be used by an instruction execution system, apparatus, or device, or be used in combination with an instruction execution system, apparatus, or device.

A computer-readable signal medium may include a data signal propagated in a baseband or propagated as part of a carrier, where the data signal carries computer-readable program code. Such a propagated data signal may take a variety of forms, including but not limited to an electromagnetic signal, an optical signal, or any suitable combination thereof. The computer-readable signal medium may alternatively be any computer-readable medium other than the computer-readable storage medium. The computer-readable medium may send, propagate, or transmit the program used by the instruction execution system, apparatus, or device, or used in combination with the instruction execution system, apparatus, or device.

The program code included in the computer-readable medium may be transmitted by using any suitable medium, including but not limited to Wi-Fi, a wire, an optical cable, RF, and the like, or any suitable combination thereof.

Computer program code for performing the operations in this application may be written in one or more programming languages, or a combination thereof. The programming languages include an object-oriented programming language, such as Java, Smalltalk, and C++, and also include a conventional procedural programming language, such as a "C" language or a similar programming language. The program code may be executed entirely on a user computer, or some may be executed on a user computer as a separate software package, or some may be executed on a user computer while some is executed on a remote computer, or the code may be entirely executed on a remote computer or a server. When a remote computer is involved, the remote computer may be connected to a user computer by using any type of network, including a local area network (LAN) or a wide area network (WAN), or may be connected to an external computer (for example, connected by using an Internet service provider through the Internet).

It should be noted that the foregoing are merely example embodiments of this application and used technical principles. It is appreciated by persons skilled in the art that the present invention is not limited to the particular embodiments herein and they can make various obvious changes, adjustments, and substitutions without departing from the protection scope of the present invention. Therefore, although this application is described in detail by using the foregoing embodiments, the present invention is not limited to the foregoing embodiments, and may further include more other equivalent embodiments without departing from the concept of the present invention, which all fall within the protection scope of the present invention.

The invention claimed is:

1. A motor controller, configured to control a motor, wherein the motor controller comprises:
a processor; and
a memory coupled to the processor and having processor-readable instructions stored thereon, which are executed by the processor and cause the motor controller to:
obtain a heat generation instruction for the motor; and
respectively inputs harmonic currents to three phases of windings of the motor according to the obtained heat generation instruction, wherein the harmonic currents in the three phases of windings have a same time phase, and harmonic currents of two of the three phases of windings are equal.

2. The motor controller according to claim 1, wherein the harmonic current is a d-axis harmonic current.

3. The motor controller according to claim 1, wherein the processor-readable instructions which are executed by the processor further cause the motor controller to:
input a fundamental current to the three phases of windings of the motor at the same time, and the fundamental current causes the motor to output a torque.

4. A controller,
configured to control a multi-motor drive system, wherein the multi-motor drive system comprises two or more motors, and the controller comprises:
a processor; and
a memory coupled to the processor and having processor-readable instructions stored thereon, which are executed by the processor and cause the controller to:
obtain a heating target temperature value;
determines, based on the heating target temperature value, a heating motor that needs to generate heat from the two or more of motors of the multi-motor drive system, wherein there are one or more heating motors that need to generate heat; and
sends a first control instruction to the heating motor, wherein the first control instruction is used to cause the heating motor to generate heat.

5. The controller according to claim 4, wherein
the first control instruction is further used to cause the heating motor to operate in a first mode or a second mode, wherein in the first mode, only harmonic currents are respectively input to three phases of windings of the heating motor, the harmonic currents in the three phases of windings have a same time phase, and the harmonic currents in the three phases of windings add up to zero; and in the second mode, a fundamental current required by the heating motor to output a torque, and the harmonic currents are input to the three phases of windings of the heating motor at the same time.

6. The controller according to claim 4, wherein the processor-readable instructions which are executed by the processor further cause the controller to: determine heat generation power of the heating motor based on the heating target temperature value, wherein the first control instruction is further used to cause the heating motor to generate heat based on the heat generation power.

7. The controller according to claim 4, wherein the controller sends a second control instruction to a non-heating motor in the plurality of motors other than the heating motor, wherein the second control instruction is used to control the non-heating motor to operate in a third mode or to be powered off, and in the third mode, only a fundamental current required by the non-heating motor to output a torque is input to the non-heating motor.

8. The controller according to claim 4, wherein,
in response to a temperature of the heating motor being higher than a first temperature threshold, the controller sends a third control instruction to the heating motor, wherein the third control instruction is used to reduce the heat generation power of the heating motor, or control the heating motor to switch from a first mode or a second mode to a third mode or to be powered off.

9. A vehicle comprising:
a motor; and
a controller configured to control the motor, wherein the controller comprises:
a processor; and
a memory coupled to the processor and having processor-readable instructions stored thereon, which are executed by the processor and cause the controller to:
obtains a heat generation instruction for the motor; and
respectively inputs harmonic currents to three phases of windings of the motor according to the obtained heat generation instruction, wherein the harmonic currents in the three phases of windings have a same time phase, and harmonic currents of two of the three phases of windings are equal.

10. The vehicle according to claim 9, wherein the harmonic current is a d-axis harmonic current.

11. The vehicle according to claim 9, wherein the controller inputs a fundamental current to the three phases of windings of the motor at the same time, and the fundamental current causes the motor to output a torque.

12. The vehicle according to claim 9, comprising two or more motors:
wherein the processor-readable instructions which are executed by the processor further cause the controller to:
obtains a heating target temperature value:
determine, based on the heating target temperature value, a heating motor that needs to generate heat from the plurality of motors, wherein there are one or more heating motors that need to generate heat; and
send a first control instruction to the heating motor, wherein the first control instruction is used to cause the heating motor to generate heat.

13. The vehicle according to claim 12, wherein the first control instruction is further used to cause the heating motor to operate in a first mode or a second mode, wherein in the first mode, only harmonic currents are respectively input to three phases of windings of the heating motor, the harmonic currents in the three phases of windings have a same time phase, and the harmonic currents in the three phases of windings add up to zero; and in the second mode, a fundamental current required by the heating motor to output a torque, and the harmonic currents are input to the three phases of windings of the heating motor at the same time.

14. The vehicle according to claim 12, wherein the controller is further configured to determine heat generation power of the heating motor based on the heating target temperature value, wherein the first control instruction is further used to cause the heating motor to generate heat based on the heat generation power.

15. The vehicle according to claim 12, wherein the controller sends a second control instruction to a non-heating motor in the plurality of motors other than the heating motor, wherein the second control instruction is used to control the non-heating motor to operate in a third mode or to be powered off, and in the third mode, only a fundamental current required by the non-heating motor to output a torque is input to the non-heating motor.

16. The vehicle according to claim 12, wherein in response to a temperature of the heating motor being higher than a first temperature threshold, the controller sends a third control instruction to the heating motor, wherein the third control instruction is used to reduce the heat generation power of the heating motor, or control the heating motor to switch from a first mode or a second mode to a third mode or to be powered off.

* * * * *

UNITED STATES PATENT AND TRADEMARK OFFICE
CERTIFICATE OF CORRECTION

PATENT NO. : 12,040,731 B2
APPLICATION NO. : 17/828930
DATED : July 16, 2024
INVENTOR(S) : Wu et al.

It is certified that error appears in the above-identified patent and that said Letters Patent is hereby corrected as shown below:

In the Claims

Claim 1: Column 28, Line 1: reads as "respectively inputs harmonic currents to three phases of" should read -- respectively input harmonic currents to three phases of --.

Claim 4: Column 28, Line 24: reads as "determines, based on the heating target temperature value," should read as -- determine, based on the heating target temperature value, --.

Claim 4: Column 28, Line 29: reads as "sends a first control instruction to the heating motor," should read as -- send a first control instruction to the heating motor, --.

Claim 9: Column 29, Line 10: reads as "obtains a heat generation instruction for the motor;" should read as -- obtain a heat generation instruction for the motor; --.

Claim 9: Column 29, Line 12: reads as "respectively inputs harmonic currents to three phases" should read as -- respectively input harmonic currents to three phases --.

Claim 12: Column 29, Line 25: reads as "more motors:" should read as -- more motors; --.

Claim 12: Column 29, Line 29: reads as "obtains a heating target temperature value:" should read as -- obtain a heating target temperature value; --.

Signed and Sealed this
Twenty-ninth Day of April, 2025

Coke Morgan Stewart
*Acting Director of the United States Patent and Trademark Office*